US011667389B2

(12) United States Patent
Coe et al.

(10) Patent No.: US 11,667,389 B2
(45) Date of Patent: Jun. 6, 2023

(54) RELEASE MECHANISM DEVICE, PARACHUTE SYSTEMS AND PARACHUTE STABILIZATION

(71) Applicant: P. D. of Miami, Inc., Deland, FL (US)

(72) Inventors: William John Coe, Deland, FL (US); Ignatius Kapp, Debary, FL (US)

( * ) Notice: Subject to any disclaimer, the term of this patent is extended or adjusted under 35 U.S.C. 154(b) by 352 days.

(21) Appl. No.: 16/886,726

(22) Filed: May 28, 2020

(65) Prior Publication Data
US 2020/0377218 A1 Dec. 3, 2020

Related U.S. Application Data

(60) Provisional application No. 62/853,863, filed on May 29, 2019, provisional application No. 62/704,736, filed on May 26, 2020.

(51) Int. Cl.
*B64D 17/38* (2006.01)
*B64D 17/34* (2006.01)

(52) U.S. Cl.
CPC ........... *B64D 17/383* (2013.01); *B64D 17/34* (2013.01)

(58) Field of Classification Search
CPC ...... B64D 17/52; B64D 17/46; B64D 17/386; B64D 17/64; B64D 17/34; B64D 17/383; B64D 17/38; B64C 2201/185
See application file for complete search history.

(56) References Cited

U.S. PATENT DOCUMENTS

| | | | | |
|---|---|---|---|---|
| 2,665,163 A | * | 1/1954 | Gross | B64D 17/383 30/DIG. 4 |
| 2,852,217 A | * | 9/1958 | Engelhardt | B64D 17/383 244/151 B |
| 3,425,739 A | | 2/1969 | Frost et al. | |
| 4,619,424 A | * | 10/1986 | Twardawa | B64D 17/38 244/151 B |
| 5,816,535 A | | 10/1998 | Underwood et al. | |
| 7,264,205 B2 | * | 9/2007 | Fox, Jr. | B64D 17/62 244/151 B |
| 8,033,507 B2 | * | 10/2011 | Fox, Jr. | B64D 17/383 244/151 B |
| 9,056,678 B2 | * | 6/2015 | Forsans | B64D 1/12 |
| 2005/0230555 A1 | | 10/2005 | Strong | |

(Continued)

FOREIGN PATENT DOCUMENTS

DE 1217794 B 5/1966
EP 0699579 A1 3/1996

(Continued)

OTHER PUBLICATIONS

Machine translation of De 1217794B.

*Primary Examiner* — Justin M Benedik
(74) *Attorney, Agent, or Firm* — Shalom Wertsberger; Saltamar innovations

(57) ABSTRACT

An article of manufacture, a force reduction release mechanism and system for selectively maintaining and releasing components under tensile tension, the release mechanism offering mechanical gain such that the force required to activate a release between the components is a mere fraction of the heavy tensile tension force. Other aspects of the invention include novel cargo parachute system utilizing the release mechanism and a parachute stabilization arrangement utilizing at least one releasable stabilization anchor.

20 Claims, 20 Drawing Sheets

(56) References Cited

U.S. PATENT DOCUMENTS

2008/0011902 A1    1/2008  Fox
2011/0303793 A1*  12/2011  Fox, Jr. ................ B64D 17/383
                                                   244/151 B
2020/0123815 A1    4/2020  Fox

FOREIGN PATENT DOCUMENTS

EP          3293116 A1    3/2018
WO     WO2011011708 A2    1/2011

* cited by examiner

FIG. 1
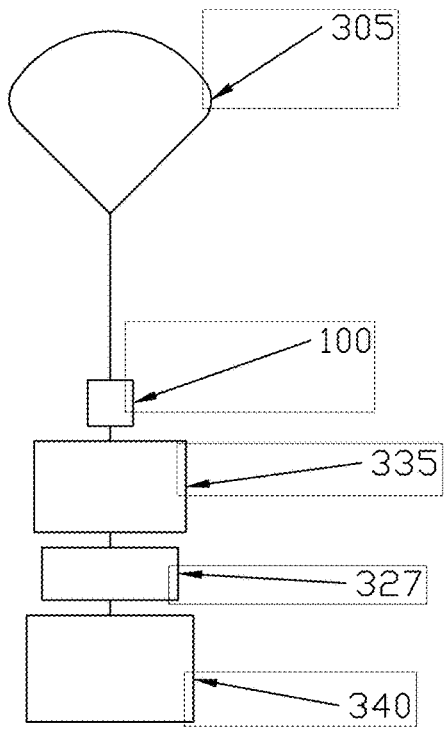
FIG. 2
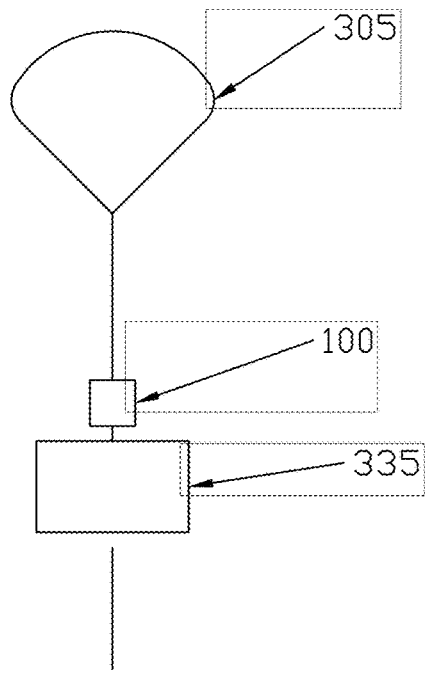
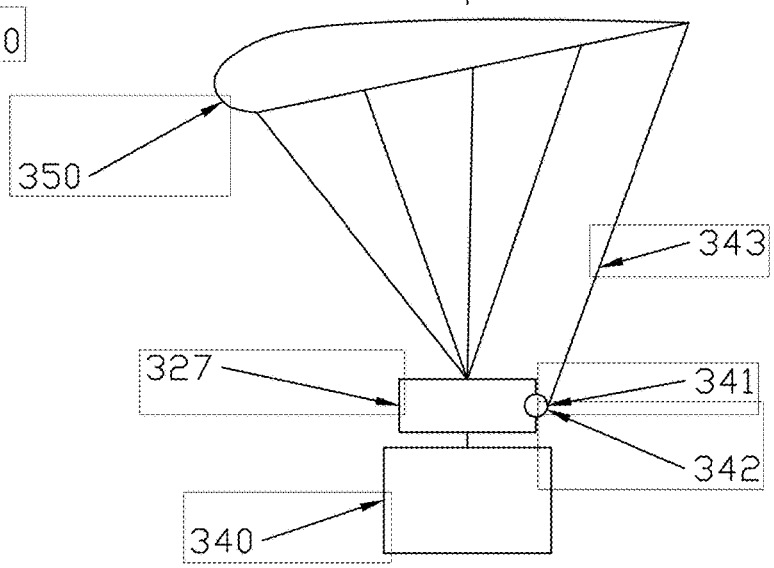

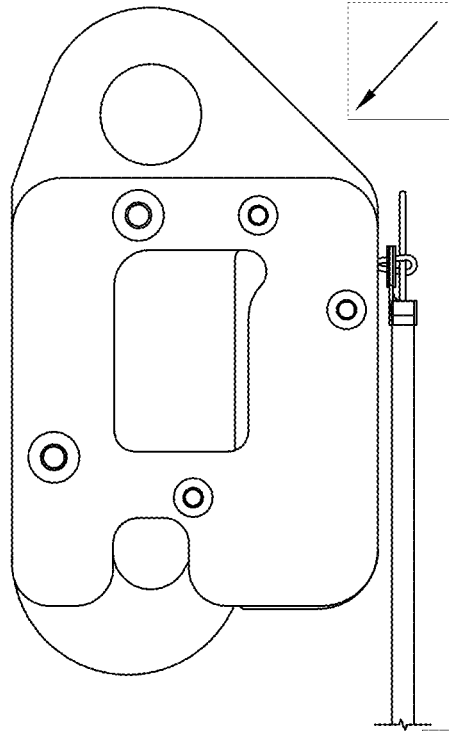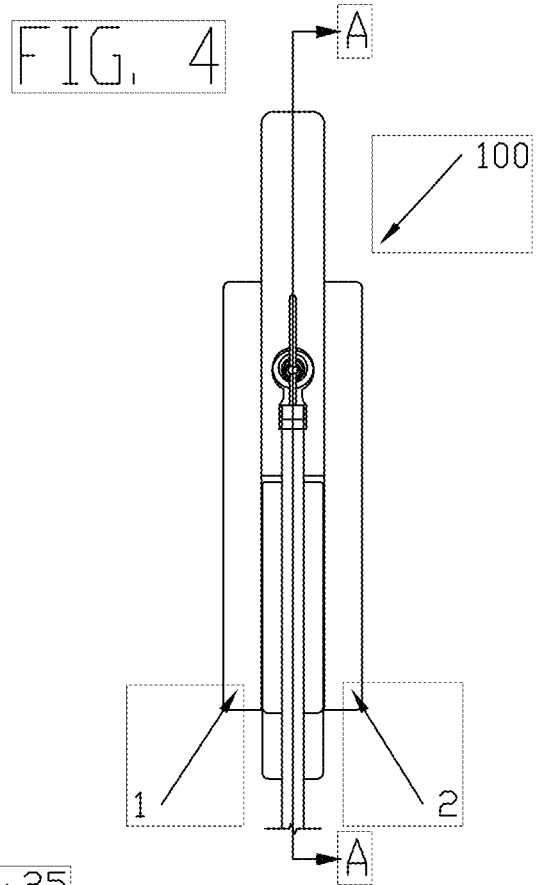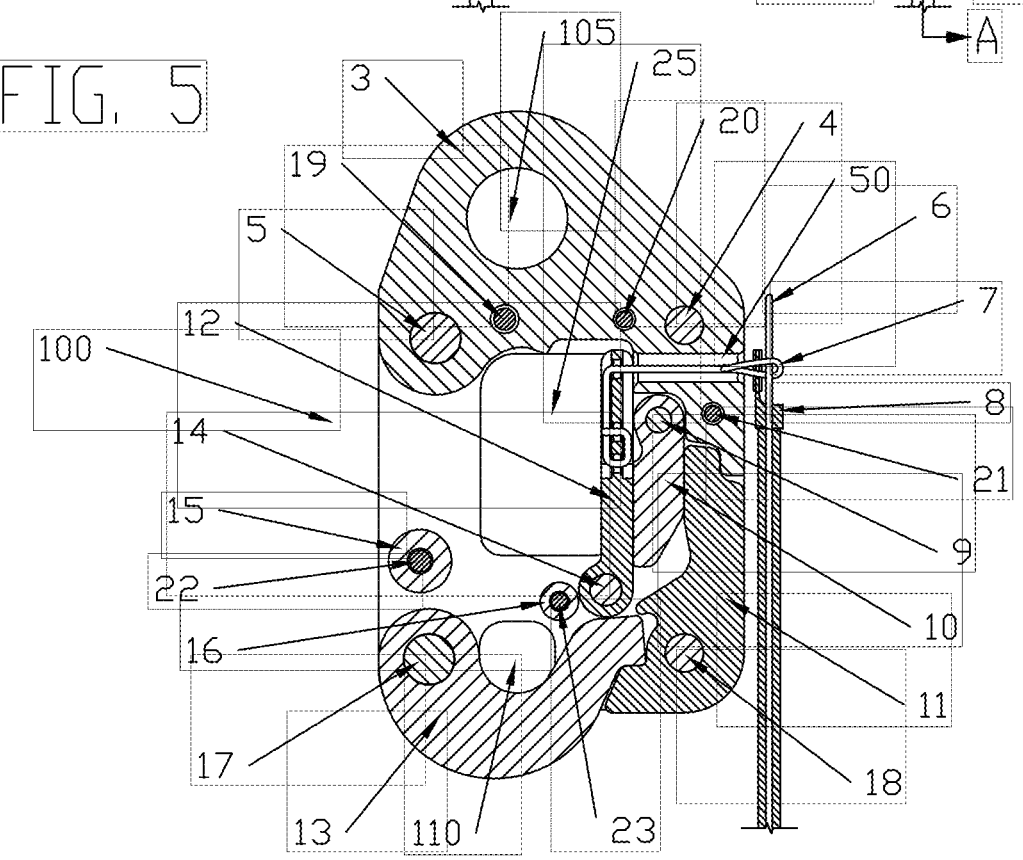

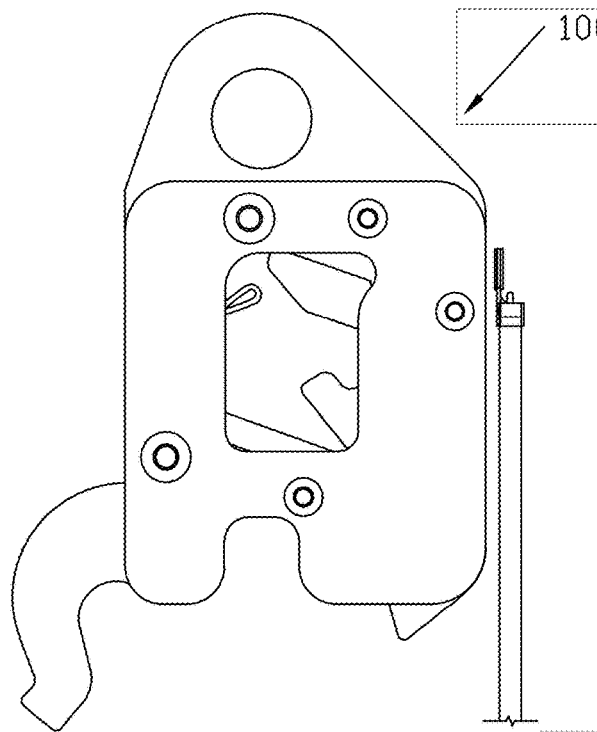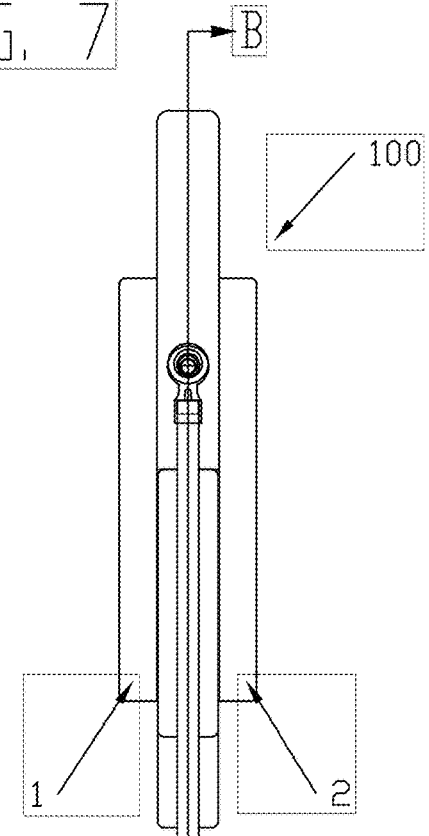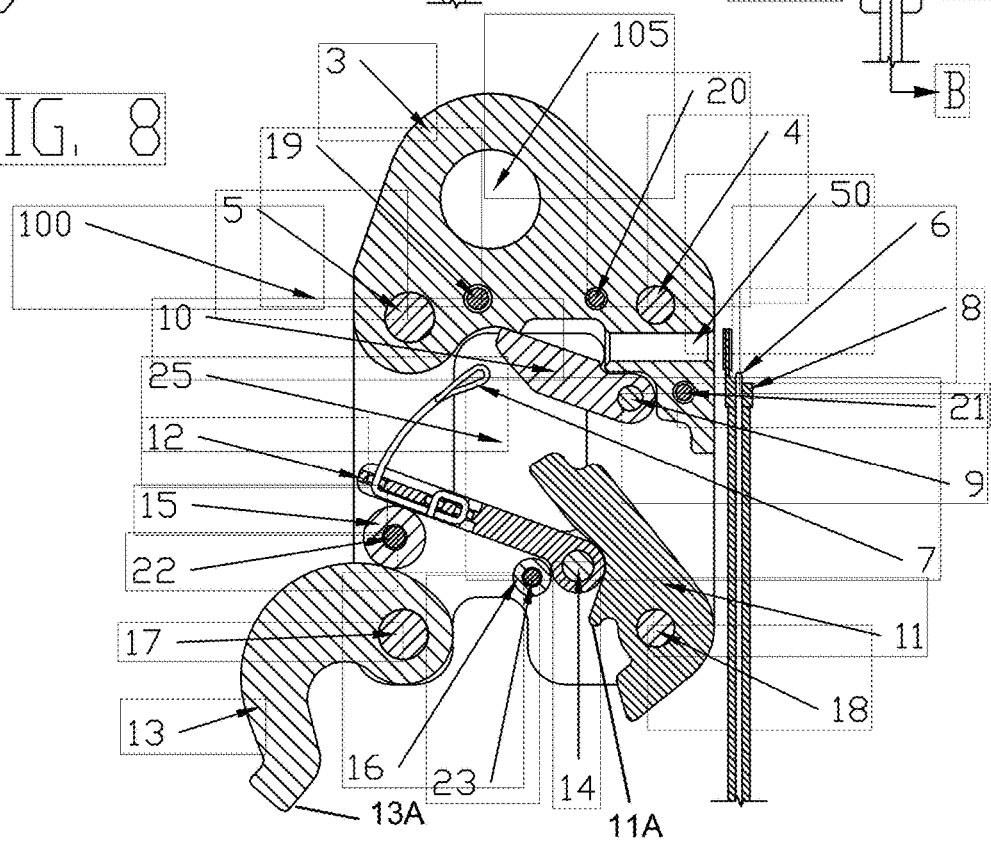

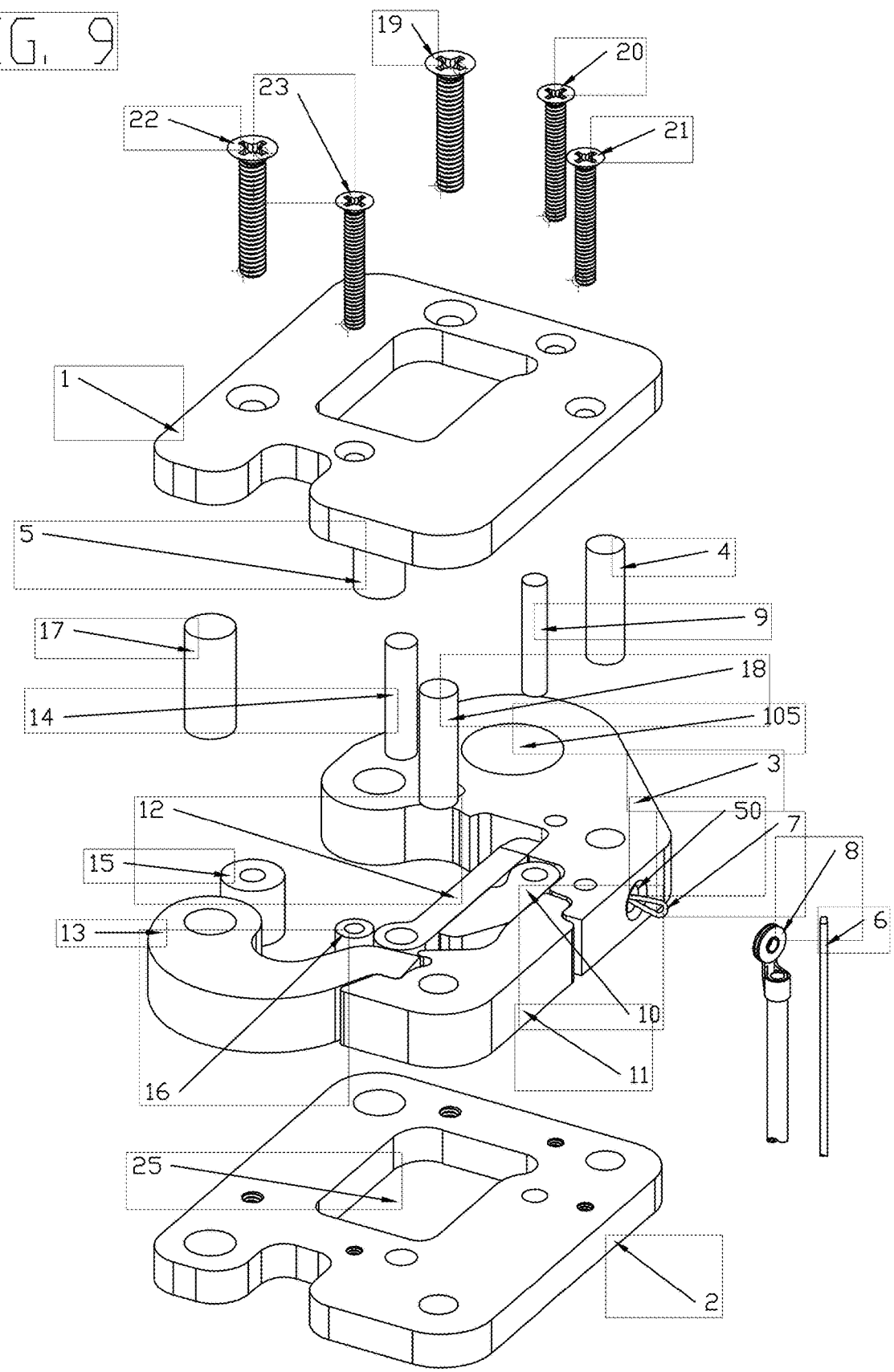

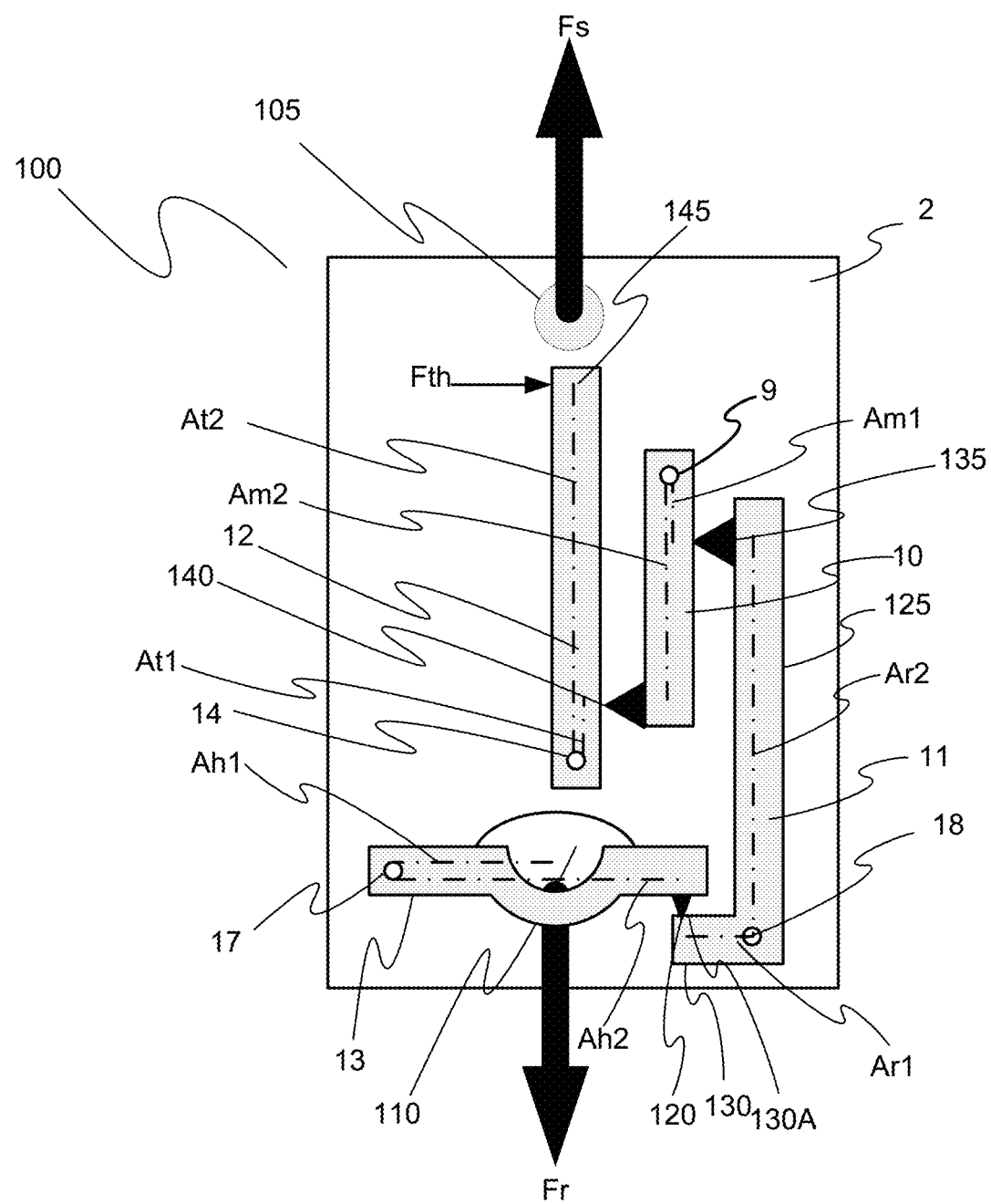

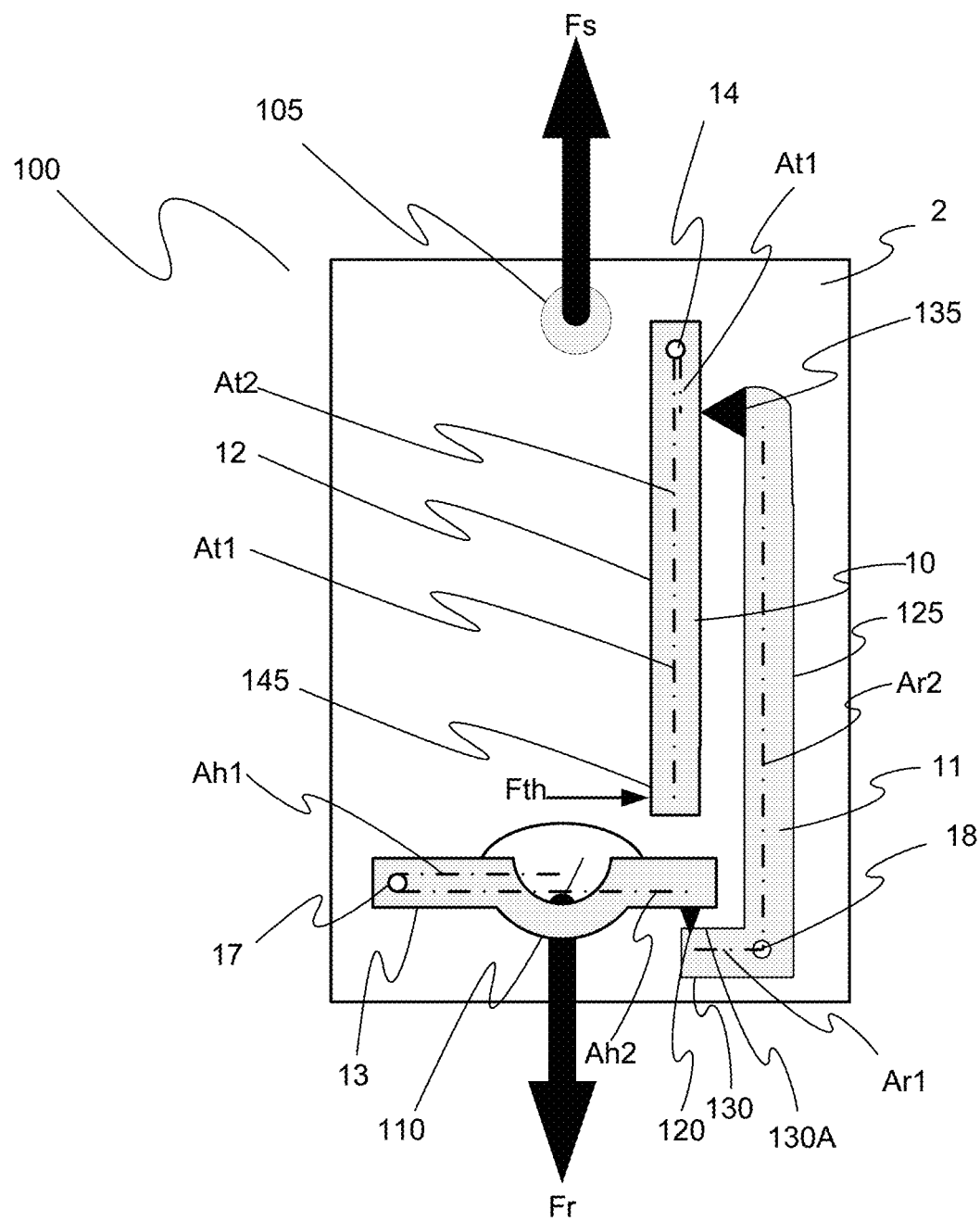

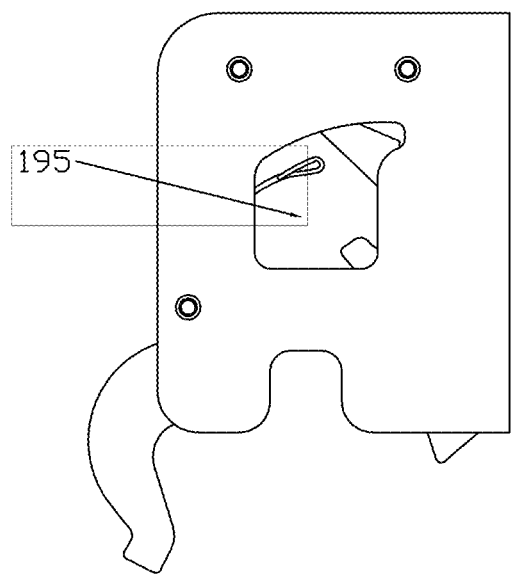
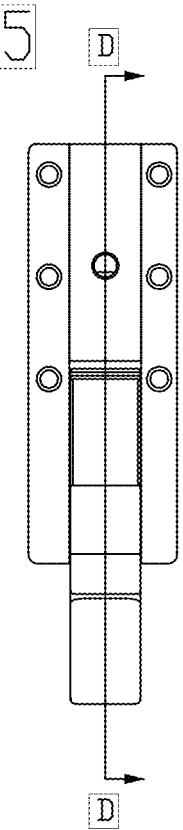
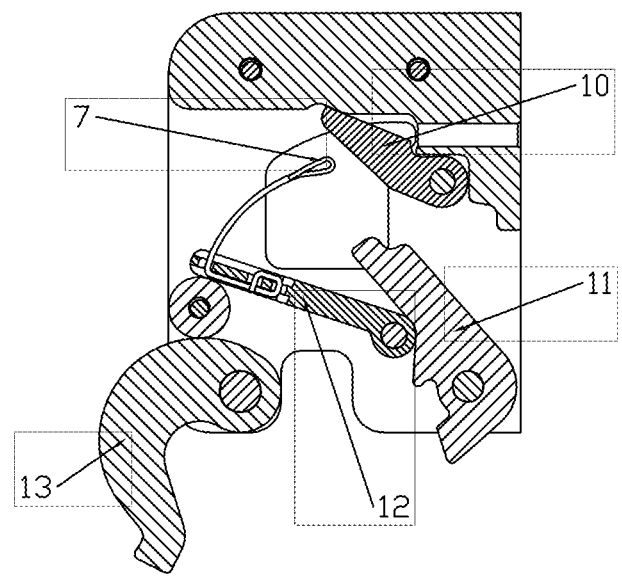

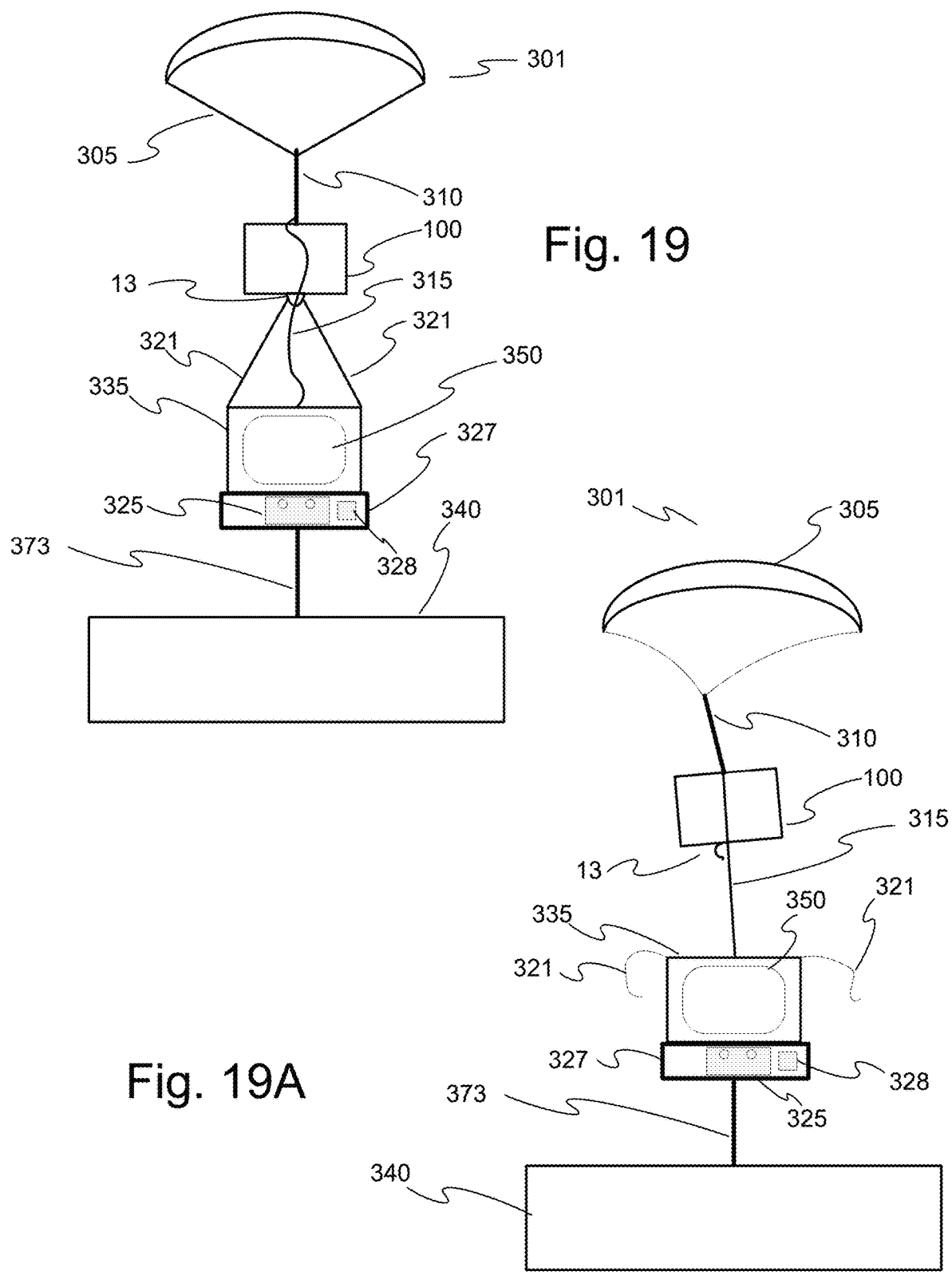

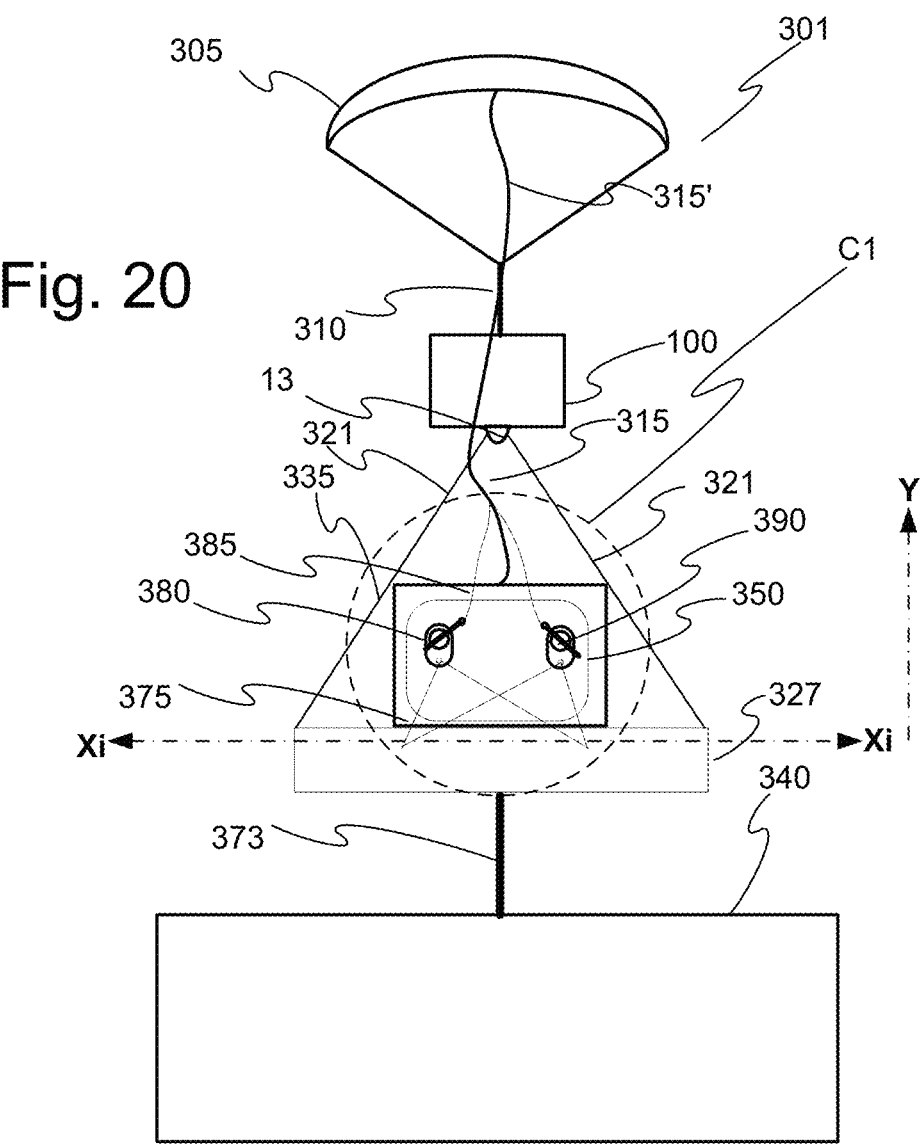

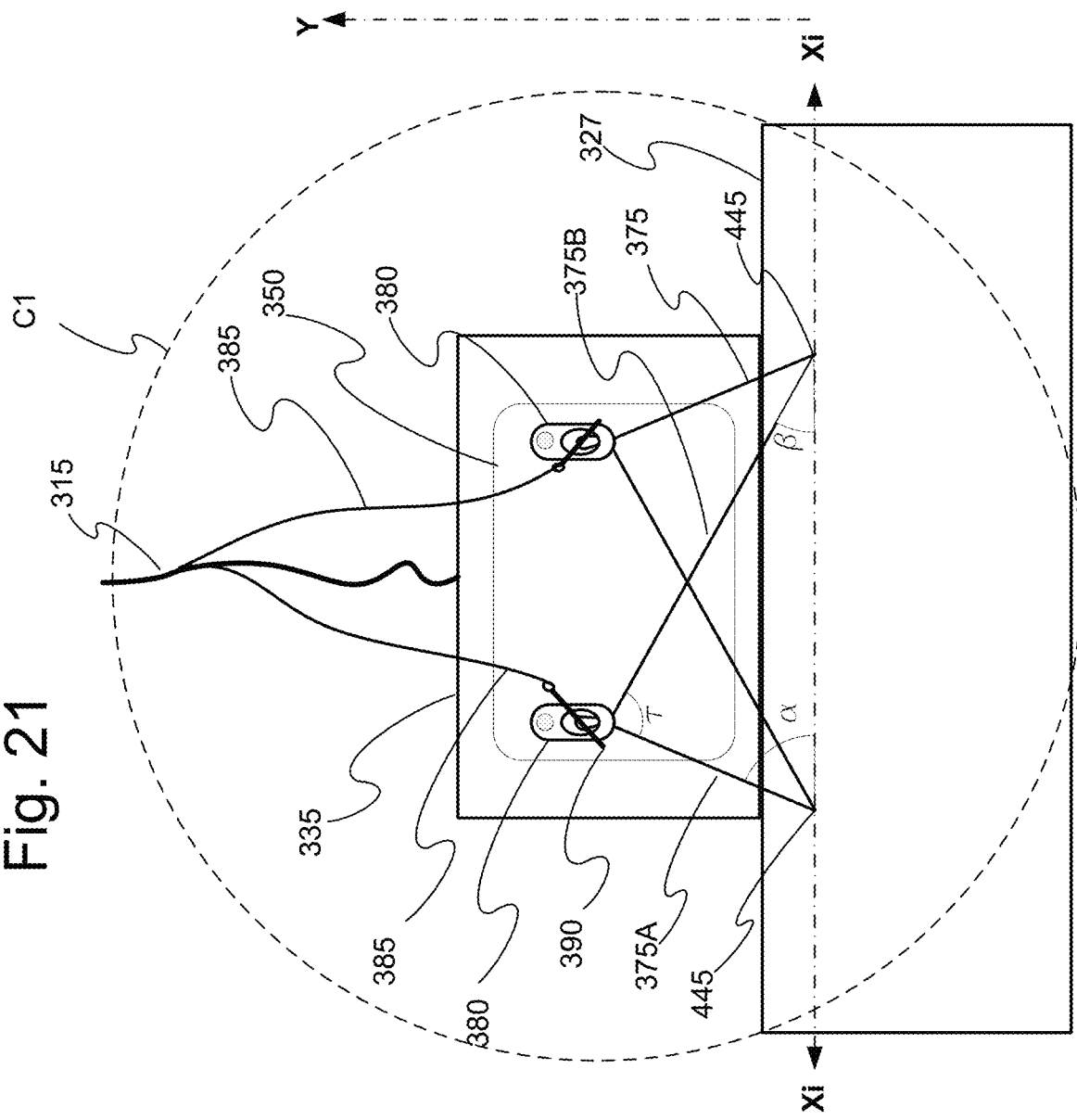

RELEASE MECHANISM DEVICE, PARACHUTE SYSTEMS AND PARACHUTE STABILIZATION

RELATED APPLICATIONS

This application claims priority to US Provisional Patent Application No. 62/853,863, filed on May 29, 2019, and U.S. Provisional Patent Application No. 62/704,736, filed May 26, 2020, both which are incorporated herein by reference in their entirety, including any addendums, appendixes and attachments thereto, to the extent these applications do not conflict with the present disclosure herein.

COPYRIGHT NOTICE

A portion of the disclosure of this Patent document, including the drawings and Appendices, contain material which is subject to copyright protection. The copyright owner has no objection to the facsimile reproduction by anyone of the Patent document or the Patent disclosure as it appears in the Patent and Trademark Office Patent files or records as long as clear and visible reference is made showing the applicant, patent or patent publication number, but otherwise reserves all copyright rights whatsoever.

FIELD OF THE INVENTION

Versions and embodiments of the present invention relate generally to line release mechanisms and systems, and more particularly to devices, mechanisms and systems for reducing tensile release forces of taut lines such as ropes, cords, wires, rods, and the like. Embodiments of the invention relate to parachute cargo systems used by operators to release parachutes at high tensile activation force loads carried in drogue-fall and as a mechanism to release a drogue parachute from its cargo load and/or causing release of the main parachute.

BACKGROUND

Different embodiments of the invention shall be described primarily as they relate to the field of high weight load cargo parachute systems in drogue-fall.

High-weight loads during drogue-fall of parachute cargo systems create high release activation forces which tend to limit the weight of the cargo package, as higher weight equal higher activation forces that must be applied to deploy the main parachute from its cargo load. Such higher forces require additional energy and a cumbersome release mechanism.

Prior art solutions have been a "single Latch system" device with minor mechanical advantage and prone to premature release of the drogue at high altitude and high wind blast exit forces. Another prior art solution uses a pyrotechnic explosive cutter to sever the drogue parachute from the main parachute. This solution had negative consequences such as premature releases, and a consumable item which was disliked by the users. Additional negatives are difficulty of shipping hazardous materials within a country and heightened regulatory scrutiny when importing/exporting hazardous materials to foreign countries.

Thus, there is an ongoing and heretofore unmet need for a reliable mechanism and system which allows releasing of a line under load utilizing lower release force. A force reduction release mechanism and system (herein referred to as "release mechanism") for tensile forces and "triggers" and other activation devices are disclosed herein.

SUMMARY

Advantages of versions of the present invention include avoidance of most if not all of the above prior art shortcomings by using the disclosed force reduction release mechanism(s) and other novel components.

It is an object of certain aspects of the present invention to provide a mechanism for releasing one or more lines under tension utilizing a release force lower than the force of the tensioned line or lines.

It is a further object of certain aspects of the invention to provide a reduced force release mechanism for parachutes in general and for cargo parachutes and parachuting systems that will prevent premature releases.

It is further an object of certain aspects of the present invention to provide a mechanism for releasing a drogue parachute in tension utilizing a release mechanism which imposes low activation force from various release control devices.

To that end, in an aspect of the invention there is provided a release mechanism which couples a parachute with its cargo, which operationally impart mutual tensile force to each other via at least one tensioned line, while allowing release of the tensioned line(s) using an activation force which is but a fraction of the load. In certain embodiments the mechanism may be uniquely calibrated to have variable reduction in the required release forces as desired by the operator. These uniquely calibrated mechanisms may be made during manufacture by adjusting the lever arm lengths, lever hinge locations, lever contact points, etc. resulting in specific release forces as needed/desired for specific uses by the operator.

In these specifications the term 'operational' and its variations (such as "operationally" by way of example) should be construed when applied to the release mechanism or to portions thereof, to describe the release mechanism while a tension is applied between its anchor point and the hook, or immediately after release of such tension subsequent to a transition of the release mechanism from close state where it is under tension to an open state where the tension is released, as well as to release mechanism is being in the transition period. When the term 'operational' and its variations is applied to a parachute system it should be construed to describe the parachute system while being dropped from an aircraft, in all of the respective stages of the transition from the aircraft to the ground.

In an aspect of the invention there is provided a tension release mechanism having a closed state and an open state, the release mechanism comprising a support frame defining an operational plane, a fixed anchor region disposed in the frame or coupled thereto, and a plurality of interlockable levers operational to controllably maintain the release mechanism in closed state, and to release at least one tensioned line from the release mechanism responsive to transitioning of the interlocking levers, and thus the release mechanism, from the closed state to an open state. The interlockable levers are interlocked when the release mechanism is in the closed state.

In certain embodiments the release mechanism comprises a trigger lever 12 comprising a retaining region and a trigger fulcrum. The trigger lever is rotatable about the trigger fulcrum; a middle lever 10 has a middle lever abutment 140, and is rotatable about a middle lever fulcrum. The middle lever is disposed such that when the mechanism is operationally in the closed state the middle lever abutment 140 rests against the trigger lever 12 at a trigger lever load region; a release lever 11 has a release lever abutment 135 and is rotatable about a release lever fulcrum 18. The release lever further comprises a hook retainer 130A. The release lever is disposed such that when the release mechanism is operationally in the closed state the release lever abutment 135 rests against the middle lever 10 at a middle lever load region. A hook 13 is rotatable about hook fulcrum 17 and has a hook abutment 120, the hook is disposed such that when the release mechanism is operationally in closed state, the hook abutment directly or indirectly engages the hook retainer 130A. At least a portion of the hook cooperates with at least a portion of the frame, to define a closure dimensioned to receive and retain the operationally tensioned line or an extension thereof. A trigger is coupled to the trigger lever 12 retaining region, the trigger being operative to selectively maintain the trigger lever at a locked state where the trigger lever prevents the middle lever from rotating away from the release lever, therefore maintaining the release mechanism in the closed state, the release mechanism is configured such that operationally when the trigger lever is not in the locked state, i.e. when the trigger does not maintain the trigger lever in the locked state, the middle lever is capable of rotating away from the release lever, allowing the release lever to rotate and release the hook abutment from the hook retainer 130A, and thus transition the release mechanism from the closed state to the open state.

In some embodiments the trigger comprises a trigger line routed outside of the frame. Optionally the trigger line terminates at a loop routed through an opening. Further optionally a release line is disposed to selectively retain and release the trigger line loop.

In some embodiments the frame comprises a first and a second plate and at least the hook and the release lever are disposed between the first and second plate. On other embodiments the frame comprises a single backing plate. Optionally the first and/or the second plates has a void therein.

In some embodiments the closure is defined by a portion of the frame substantially opposite the fixed anchor point and by a portion of the hook disposed between the hook hinge and the hook abutment. In some embodiments the closure forms a partially open periphery, the periphery dimensioned so as to retain the tensioned line therein when the mechanism is in the closed state, and release the tensioned line therefrom when the mechanism is in the open state.

Optionally, the release lever further comprising a protrusion disposed at an angle to a longitudinal axis of the release lever, comprises the hook retainer 130A being coupled to, or integral with the protrusion.

In certain embodiments the fixed anchor point is connected to a tension inducing object at a connection region. In certain embodiment the fixed anchor point is configured to receive a line therein. Features of certain aspects of the invention may be combined and applied to other aspects disclosed herein.

It is seen that the present specifications disclose, inter alia, in varied embodiments, a tension release mechanism having a closed state and an open state, the release mechanism comprising a support plate, a fixed anchor region disposed in the plate or coupled thereto, and a plurality of interlockable levers in mechanical sequential communication therebetween disposed on the plate. Each of the levers has a retaining region having a retainer or an abutment, a rotatable fulcrum point within a fulcrum region, and a load point within a load region, the first lever in the mechanical sequence operates as a trigger lever to start a release sequence, the last lever in the mechanical sequence forms a releasable rotatable hook to end the release sequence. The levers interlock in a first pre-determined configuration in the closed state and unlock into a second pre-determined configuration in the open state. The levers are arranged such that when the release mechanism is operationally in tension between the fixed anchor region and the releasable hook load region, and while in the closed state configuration the trigger lever is prevented from rotating. Allowing the trigger lever to rotate, allows the interlocking levers in mechanical sequential communication to release the rotatable hook lever, transitioning the release mechanism into the open state.

In an aspect utilizing a release mechanism as described in any of the aspects and embodiments disclosed herein, the release mechanism is utilized in a cargo parachute system. Such system includes a load, a main parachute optionally disposed in a deployment bag, a drogue parachute and an actuator, the parachute is operationally coupled to the load, and when such system is being dropped from a drop altitude, the release mechanism being coupled between the drogue parachute and the main parachute, and/or the deployment bag, wherein the release mechanism is being controlled by the actuator which transitions the release mechanism from a closed state to an open state. The drogue is functional to slow down the fall rate of the load while when in the closed state. When the release mechanism reaches the open state, in some embodiments the drogue is operational to release a deployment bag closure, in some embodiments the drogue is operational to impart extraction force to the main parachute, and in some embodiments the drogue performs a combination of both functions. It is important to recognize that the a portion of the novelty of this aspect constitute the recognition of the need for a release mechanism in a parachute cargo system and its selection based on the novel advantages of reducing the release forces required for releasing the drogue, with the resulting increase in load capacity, while preventing premature parachute openings.

The actuator may be selected from an altitude sensing actuator, a timer controlled actuator, a speed sensor controlled actuator, an acceleration sensor controlled actuator, a location sensor controlled actuator, a radio controlled actuator, a light controlled actuator, a guidance system controlled actuator, temperature sensing actuator, pressure sensing actuator and any combination thereof.

In certain embodiments the cargo parachute system further comprises a guidance system 326, such as a navigation system or a remote-control system to urge the parachute system to a desired path. In certain embodiments the navigation system is a satellite-based navigation system, a radio-based navigation system, laser-based navigation system, artificial vision-based navigation system, or Inertial Navigation System (INS). Optionally activation of the actuator is controlled by the guidance system. Further optionally in certain embodiments actuator comprises the guidance system or a portion thereof.

In yet another aspect of the invention there is provided a parachute bag stabilization system in a cargo parachute system having a drogue parachute, a main parachute initially disposed in a deployment bag, and a cargo load coupled to the main parachute via an intermediate load attachment platform, the parachute bag stabilization system being functional to secure the main parachute deployment bag containing the main parachute to the platform during a drogue fall, the parachute bag stabilization system comprising at least one operationally taut retention line extending between the parachute bag and the platform, and coupled to at least one of the deployment bag or the platform by a releasable stabilization anchor, the stabilization anchor being releasable responsive to a dislodgment of a pull pin coupled directly or indirectly to the drogue parachute.

Optionally the stabilization anchor comprises an anchor plate defining a passage therethrough, a retainer member operationally and removably disposed partially through the passage, and the pull pin being disposed to maintain the retainer member disposed through the passage when the retainer member is engaged by the pull pin, and release the retainer member to be removed from the passage when the pull-pin is dislodged. The retainer member may be, by way of non-limiting example, an eyelet coupled to at least one retention line, a bight formed in at least one retention line, or an anchor pin extending partially through the passage and prevented from being released from the passage by the pull pin.

In some embodiments the stabilization anchor is disposed on the deployment bag, in other embodiments the attachment point is disposed on the platform and in some embodiments at least one stabilization anchor is disposed on the deployment bag and at least one stabilization anchor is disposed on the platform. In numerous applications a plurality of retention lines is utilized, each with its respective stabilization anchor. The anchor plate may be affixed to the retention bag, the platform, or coupling between segments of the retention line. In some embodiments the anchor plate is embodied as a passage defined in a portion of the platform.

BRIEF DESCRIPTION OF THE DRAWINGS

Some embodiments of the invention are described herein with reference to the accompanying drawings. The description, together with the figures, enables and makes apparent to a person having ordinary skill in the art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures are not to scale. Understanding that these drawings depict only typical embodiments of the invention and are not therefore to be considered to be limiting of its scope, the invention will be described and explained with additional specificity and detail through the use of the accompanying drawings in which:

FIG. 1 depicts schematically a parachute system utilizing a release mechanism with the drogue parachute and release mechanism in the closed state.

FIG. 2 depicts schematically a parachute system utilizing a release mechanism with the drogue parachute and release mechanism in the open state, and the main parachute being deployed.

FIG. 3 depicts a front view of an embodiment of a release mechanism of FIG. 1 in closed position.

FIG. 4 depicts a side view of the release mechanism of FIG. 3 in closed position.

FIG. 5 depicts a section view of the release mechanism of FIG. 3 in closed position.

FIG. 6 depicts a front view of the release mechanism of FIG. 3 in open position.

FIG. 7 depicts a side view of the release mechanism of FIG. 3 in open position.

FIG. 8 depicts a section view of the release mechanism of FIG. 3 in open position.

FIG. 9 depicts an expanded view of the release mechanism of FIG. 3 disassembled into component parts.

FIG. 10 depicts a simplified force diagram of the active levers in the release mechanism, in a closed state and while being under tension between the standing and running lines. FIGS. 10A and 10B depict other optional arrangements of levers within the release mechanism.

FIG. 14 depicts a front view of the release mechanism of FIG. 11 in open state.

FIG. 15 depicts a side view of the release mechanism of FIG. 11 in open state.

FIG. 16 depicts a section view of the release mechanism of FIG. 11 in open position.

FIGS. 19 and 19A depict schematically a cargo parachute system according to an embodiment utilizing a sling to couple the parachute system and the cargo, at two stages of the parachute deployment.

FIG. 20 depict schematically a cargo parachute system utilizing a parachute stabilization arrangement and a release mechanism.

FIGS. 21 and 21A depict schematically two exemplary embodiments of a parachute stabilization system.

Figure 10A:
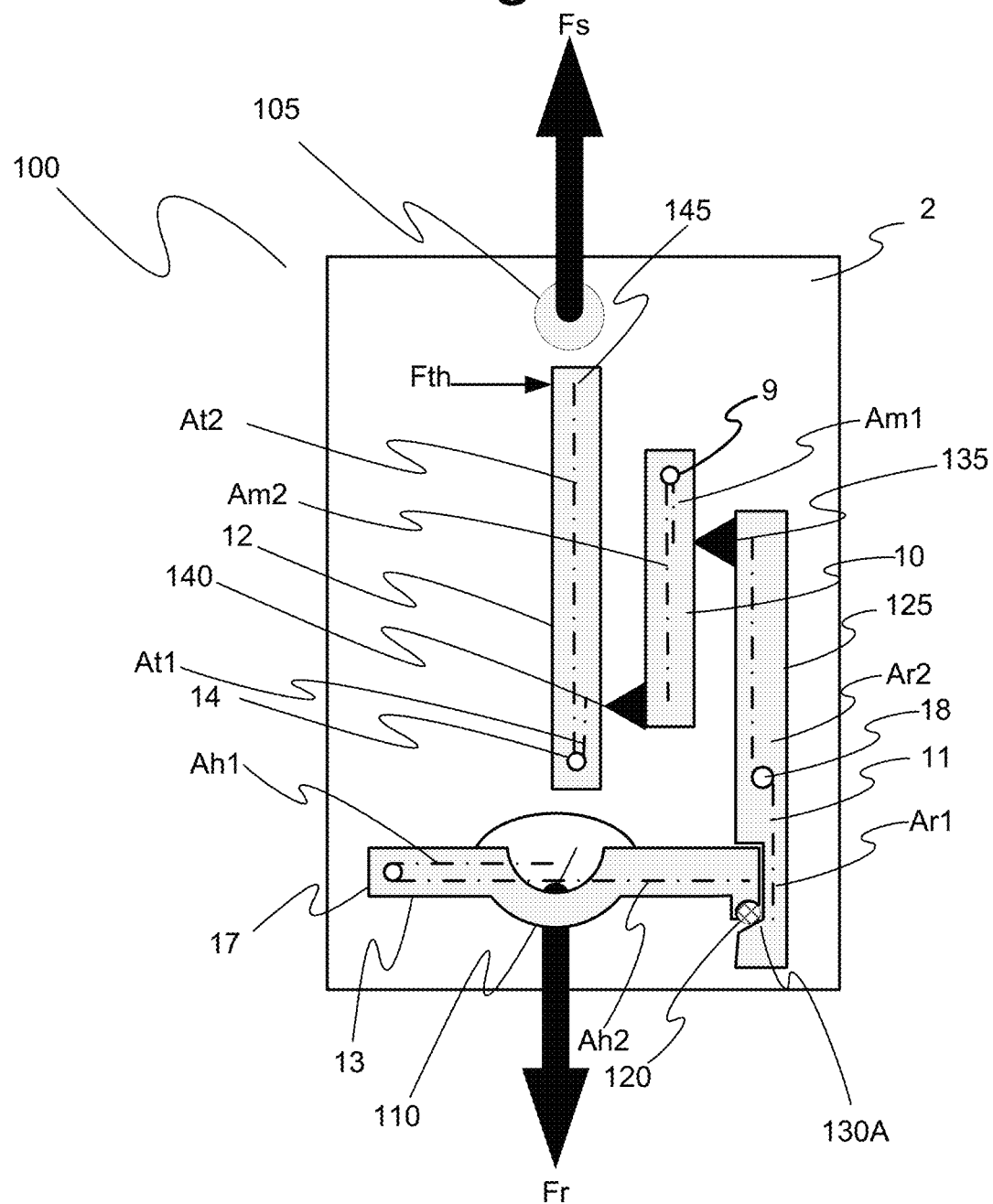

While aspects of the present invention will be described with reference to the details of the embodiments of the invention shown in the drawings (and some embodiments not shown in the drawings), these details are not intended to limit the scope of the invention.

DETAILED DESCRIPTION OF EXEMPLARY EMBODIMENTS

Embodiments of a release mechanism and additional components will be described below, by way of exemplary illustration only. The described embodiments should not be construed as limiting the scope of different aspects and embodiments of the invention. Versions illustrating basic concept of various aspects of the invention are shown in detail in the drawings.

FIG. 1 depicts a schematic diagram of a version of a cargo parachute system utilizing the release mechanism 100 in closed state in tension from drogue-fall forces between the drogue parachute standing line and cargo load running line. FIG. 2 depicts a schematic diagram of the parachute system of FIG. 1 with the release mechanism 100 in open state, allowing the main parachute to deploy and inflate. FIG. 2 also depicts a left steering spool(s) 341 and right steering spool(s) 342 that are coupled to a guidance system which physically steer the deployed main parachute 350 to land on the intended drop zone target. In FIG. 2 the two spools are shown as a single spool due to the relative orientation of the two spools in the drawing, however the skilled in the art would recognize that one spool is located behind the other. In some embodiments the steering spools manipulate the steering lines 343 to control the main parachute 350. In some embodiments the spools may be used as an actuator to trigger the release mechanism 100.

FIGS. 3-5 depict an embodiment of the release mechanism 100 in a closed state. FIG. 3 depicts a front view and FIG. 4 depicts a side view of the release mechanism 100. FIG. 4 depicts the front plate 1 and rear plate 2. The depicted embodiment utilizes front and back plates having a void, however other versions utilize solid plate in both or either of the front plate and/or back plate. At least one of the plates, and preferably both plates in combination, form a support frame. At least one of the plates define an operational plane. In certain embodiments only a single plate is utilized. In the depicted embodiments the top mount plate acts as the fixed anchor region of the release mechanism.

FIG. 5 depicts a cross section of the release mechanism along axis A-A of FIG. 4, Additional components of the embodiment of FIG. 5 are shown with top mount plate 3, top right pin 4, top left pin 5, release activation line 6, release activation loop 7, release activation loop opening 50, release activation line housing 8, middle lever hinge pin 9, first middle lever 10, release lever 11, trigger lever 12, rotatable hook 13, trigger lever hinge pin 14, hollow spacer 15, hollow spacer 16, rotatable hook hinge 17, and release lever hinge pin 18.

FIGS. 6, 7, and 8 depicts the release mechanism in an opened state. FIG. 6 is a frontal view of the release mechanism in an open state. FIG. 7 depicts a side view of the release mechanism shown in open state. FIG. 8 depicts a cross-section along line B-B.

An optional feature of the design of release lever 11 depicted in FIG. 8 includes a positioning protrusion 11A, which facilitates closing of the release mechanism. Upon rotation of the rotatable hook to closed position, a portion 13A of rotatable hook 13 engages positioning protrusion 11A and positions the release lever 11 to a closed state disposition. Furthermore, the positioning protrusion 11A may optionally be dimensioned to limit movement of rotatable hook 13 while the release mechanism is in the closed state.

Referring to FIG. 9, the components of a version of the release mechanism in FIGS. 3-8 are shown in exploded view, with front plate 1 and rear plate 2 (displaced for clarity). Also shown are top mount plate 3, top right pin 4, top left pin 5, release activation line 6, release activation loop 7 attached to trigger lever 12, release activation loop opening 50, release activation line housing 8, middle lever hinge pin 9, middle lever 10, trigger lever 12, and hook lever acting as rotatable hook 13, rotatable hook lever hinge pin 17, hollow spacer 15, hollow spacer 16, rotatable hook hinge pin 17, release lever hinge pin 18, and screws 19, 20, 21, 22, 23. The rotatable hook 13 acts as the last lever in the sequence of levers depicted in that embodiment. The insertion direction of the screws may be from the front plate and/or rear plate and the direction of insertion is an engineering choice.

The depicted hinge pins, such as 9, 14, 17, and 18 in the embodiment of FIGS. 3-8 act as, and are equated with by way of example, the respective fulcrums of the levers, also referred to as hinge points. Other hinge mechanisms may be utilized such as ball and socket, indentions, joint, axle, gimbals, roller bearing, bushing and the like, however the hinges mechanism serves as the fulcrum of the respective lever regardless of the specific mechanism selected. Alternative fasteners and securement methods may be utilized.

Operationally, the release mechanism 100 shown in FIGS. 3-9 controllably holds and/or releases at least two lines (not shown) under tension. For clarity the lines shall be termed a standing line and a running line, which is the line being released when the release mechanism is opened. The standing line is the line that stays attached to the release mechanism after the running line is released. Generally, the standing line is attached to the fixed anchor region. In certain embodiments, like the ones depicted in FIGS. 11-17 by way of example, a standing line is not needed, as the release mechanism is attached to the tension inducing object. Furthermore, like most other terms used in these specifications the terms 'standing line" and "running line" indicate a single or a plurality of lines.

The release mechanism is capable of transferring tension between the fixed anchor region and the running line when the release mechanism is in closed state and allow the line to separate when the release mechanism is in the open state. The standing line is attached to a fixed anchor point 105 in the mechanism and the running line is held to the release mechanism by a rotatable hook 13, which frees the running line while the release mechanism is in the open state. Optionally a standing line may be passed through an opening 195 which acts as a fixed anchoring point, however in such embodiments the opening is dimensioned such that the standing line would not hamper the mechanism operation. In the embodiment of FIGS. 3-9 top mount plate 3 depicts a cavity which acts as the fixed anchor region 105, for holding a standing line. In the embodiments depicted in FIGS. 11-17 the top spacer plate 150 acts as the top mount plate and forms a fixed anchor region which is attached to a tension forming object.

In the closed state at least a portion of the rotatable hook 13 cooperates with at least a portion of the frame, to define a closure 110 dimensioned to receive and retain the running line(s). Various closures may be utilized, and a closure does not have to define a closed shape, but must be able to hold the running line attached to the release mechanism when the release mechanism is in the closed state, and allow the running line to separate from the release mechanism when in the open state. Closed shape closures are also explicitly considered.

FIG. 10 depicts a simplified force diagram of the active levers in the release mechanism, in a closed state and while being under tension between the standing and running lines. Moment arms are shown by dash-dot lines. Only the rear plate 2 is shown, schematically. A standing line (not shown) or a load object is coupled to the fixed anchor region 105 and operationally imparts a heavy force Fs in one direction, while the running line (not shown) is coupled to closure 110 via rotatable hook 13 and imparts a heavy force Fr opposite force Fs. The force Fr also forms the hook load which defines a hook load region at the region of contact between the running line and the hook.

Rotatable hook 13 is a lever which has a hook hinge end and a hook abutment end. The hinge end is hingedly coupled to the frame at a hook hinge point which is embodied in the depicted embodiment by hinge 17 which enables the hook to rotate about the fulcrum in a plane parallel to the operational plane. The hook abutment end has an abutment 120 which is depicted schematically with a triangle, however it is noted that any portion of the hook abutment end may act as an abutment point or points, and the triangle depicts any contact point which acts as an abutment where one lever contacts the other and exert force on each other. Oftentimes the abutment is at the edge of the lever. The abutment may also protrude from the lever, or be embodied by any arrangement that allows transfer of forces between levers, or allows one lever to hold another in a predetermined position. When the release mechanism is in the closed state the abutment of the rotatable hook 13 is held in the closed position by the retention portion 130 of release lever 11. The contact point 120 between the rotatable hook and the release lever acts as a hook retainer 130A.

The hook acts as a lever, with its short arm $Ah1$ extending between the hook hinge point 17 which acts as the hook fulcrum and a point where a load force Fr is applied, and its long arm $Ah2$ extending between the fulcrum 17 and the abutment point 120, which acts as the hook effort point. The force Fr imparted by the running line is reduced at the abutment by the mechanical advantage provided by the hook acting as a lever. Thus, by way of example, if the force Fr is imparted halfway between the hinge 17 and the hook abutment 120, the hook abutment imparts as effort half the force Fr to the retention portion of the release lever 11. The region of the release lever to which the hook effort force is applied forms the release lever load region.

In the embodiment depicted in FIG. 10 release lever 11 has an elongated portion 125 and a retention portion 130 angled to the elongated portion. The release lever is hinged to the frame at a release lever hinge point which is disposed at or about the connection region between the elongated and retention portions. The release lever hinge point is embodied in the drawing by hinge 18, which acts as a release lever fulcrum. The release lever has an abutment 135 along the elongated portion 125, and when the release mechanism is in the closed state and under tension the abutment acts as the release lever effort region point and imparts a release lever effort force to the middle lever. The region of the middle lever to which the release lever effort force is applied forms the middle lever load region.

The release lever provides a mechanical advantage that is proportional to the ratio of the arm $Ar1$ extending between the load force applied to the release lever by the hook abutment 120 and the release lever fulcrum at hinge point 18, and the arm $Ar2$ extending between the release lever fulcrum 18 and the release lever abutment 135. Thus, by way of example if the ratio $Ar1:Ar2$ is 10:1 the effort force imparted by the release lever abutment 135 to the middle lever 10 is about one tenth of the force applied to the release lever by the hook abutment, or $\frac{1}{20}$ of the force Fr. Stated differently, the middle lever load force, applied by the release lever abutment 135 to the middle lever load region is reduced $\frac{1}{20}^{th}$ of the load force imparted by the running line to the hook.

Middle lever 10 is elongated and has a hinge end and abutment end. The hinge end is hinged to the frame at a middle lever hinge point, depicted by hinge 9, and acting as the middle lever fulcrum. The middle lever 10 is rotatable about its fulcrum 9. The middle lever abutment 140 imparts an effort force to trigger lever 12, when the release mechanism is operational and closed. The mechanical advantage of the middle lever is about the ratio of the arm $Am1$ extending between the middle lever fulcrum 9 and the middle lever load region, and the arm $Am2$ extending between the fulcrum 9 and the middle lever abutment 140, which acts as the middle lever effort point. In a similar manner to the release lever, if the ratio of arm $Am1:Am2$ is 10:1, the load force exerted by the middle lever on the trigger lever 12 would be about $\frac{1}{10}$ of the load force exerted on the middle lever by release lever abutment 135, or $\frac{1}{200}$ of the force Fr. The region in the trigger lever onto which the middle lever effort force is applied is the trigger lever load region.

Trigger lever 12 is elongated and has a hinge end and an opposing retaining region 145. The trigger lever hinge end is hinged to the frame at a trigger lever hinge point acting as the trigger lever fulcrum, depicted in the drawings by hinge 14. The trigger lever is rotatable about the fulcrum 14 in a plane substantially parallel to the operational plane. Similar to the other levers, the trigger lever provides mechanical advantage approximately proportional to the ratio of the arm $At2$ beginning at the fulcrum 14 and extending to the trigger lever load region where the abutment point 140 of the middle lever meets with the trigger lever and applies trigger load force thereto, and the arm $At1$ extending from the fulcrum 14 and the middle lever retaining end which is the region where a trigger holding force Fth is applied to the trigger lever to prevent it from swinging away from the middle lever. Thus, if by way of example the trigger lever provides a 1:10 mechanical advantage the force Fth required to maintain the release mechanism closed would be $\frac{1}{2000}$ of the force Fr.

FIG. 10A depicts another example embodiment of the release lever 11 where the retention portion lies along the longitudinal axis further away from the release lever fulcrum 18, and the hook retainer 130A is formed as notch or depression in the release lever, dimensioned to accept the hook abutment 120.

FIG. 10B depicts yet another example of the numerous options of pre-arranged lever configurations available as technical choices opened to the release mechanism designer in light of the disclosure of the present invention. In FIG. 10B only a release lever 11 and trigger lever 12 are utilized, but the skilled in the art would recognize that similar to the arrangement depicted in other figures, the release lever abutment 135 applies a trigger lever load force to the trigger lever 12 at a trigger lever load region, and the trigger lever is held by the trigger holding force Fth at the trigger lever retaining region 145, at the trigger lever end opposite the trigger lever fulcrum 14. In light of the present disclosure, the skilled in the art would realize numerous varied optional configurations for a release mechanism utilizing a plurality of interlockable levers in mechanical sequential communications therebetween, where a first lever in the sequence acts as a trigger lever, a last lever acts as the rotatable hook, with any number of intermediate levers therebetween in the mechanical sequence. The skilled in the art would further recognize the ease in which such configurations allow customizing the release mechanism of the present invention and such variations, for specific loads and similar design requirements and/or preferences. Thus, such variations should be considered to fall under the scope of the invention The trigger holding force Fth may be applied by numerous mechanisms, all of which shall be referred herein for brevity merely as a trigger. By way of example the trigger may be a plunger extending from above, below, or sideways to the retaining end of the trigger lever. The skilled in the art would be aware of similar holding embodiments for a trigger, such as a retractable friction pad, piston, electromagnet, fusible link, and the like.

In the depicted embodiment a trigger line is coupled to the trigger lever and applies the desired trigger hold force Fth thereto. In one example of a trigger release depicted in FIGS. 3-9, the trigger line coupled to the trigger lever retaining region comprises a release activation loop 7 which is held by a pull pin. In the depicted embodiments the pull pin is formed by the end of release activation line 6. The release activation line may be embodied in numerous ways, which results in a release of the trigger line in response to activation of the release activation line 6. By way of non-limiting example, the active portion of release activation line may be embodied in a pin, a wire, a plunger, and the like, holding the release activation loop.

As release activation line 6 is withdrawn, release activation loop 7 is released, and stops applying the trigger holding force Fth to the trigger lever, initiating the operational transition of the release mechanism from the closed state to the open state. Other embodiments of triggering may be utilized, including inter alia a solenoid, a brake, a plunger holding the first lever in the sequence of interlocking levers, and similar arrangements that would be clear to the skilled in the art in light of the requirement of removing Fth.

When the retaining end of the trigger lever is released the trigger lever responds to the trigger lever load force exerted thereupon by the middle lever abutment 140 and rotates about its fulcrum 14 away from the middle lever abutment, thus allowing the middle lever 10 to rotate about fulcrum 9 away from the release lever abutment 135, which in turn allows the release lever 11 to rotate such that the retention portion 130 release the hook abutment 120, allowing the hook 13 to release the running line, completing the transition of the release mechanism to the open state. The release mechanism in its open state may be seen in FIGS. 6-8 and 14-16. Notably, the rotatable hook may take any shape and a literal hook shape is not mandated.

Figure 11:
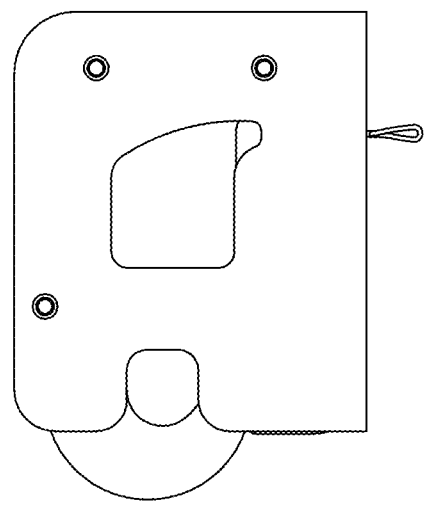
FIG. 11 depicts a front view of another embodiment of the release mechanism in closed state.

FIG. 11 depicts a front view of another version of the release mechanism, more attuned for selective connection directly between a running line and an object to which the release mechanism is coupled.

Figure 12:
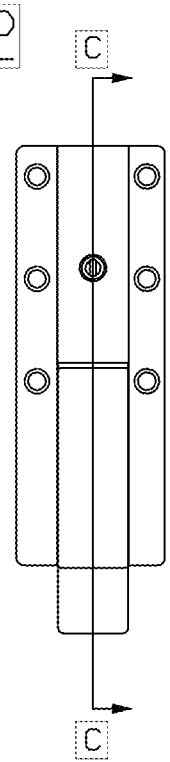
FIG. 12 depicts a side view of the release mechanism of FIG. 11 in closed state.
Figure 13:
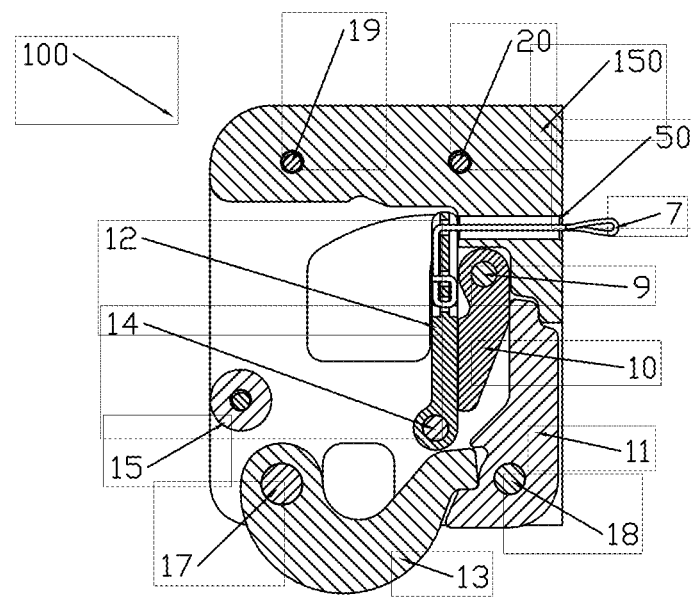
FIG. 13 depicts a section view of the release mechanism of FIG. 11 in closed state.

FIG. 12 which depicts a side view the release mechanism of FIG. 11 in closed position. FIG. 13 depicts the section view of the release mechanism of FIG. 11. This embodiment may optionally utilize solid front plate/back plates with no openings in both or either plate if desired. At least one of the plates, and preferably both plates in combination, form a support frame. At least one of the plates define an operational plane. In this embodiment the support frame itself, or a portion thereof, acts as the fixed anchor point 105. Thus, any part of the support frame may be utilized to attach the release mechanism directly to objects.

FIG. 13 depicts a cross section of the embodiment of the release mechanism depicted in FIGS. 11-12 along axis C-C. Additional components of this embodiment of FIG. 13 are shown with top spacer plate 150, top right pin 20, top left pin 19, release activation line loop 7, release activation line loop opening 50, (optional release activation line housing not shown), middle lever hinge pin 9, first middle lever 10, release lever 11, trigger lever 12, rotatable hook 13, trigger lever hinge point 14, hollow spacer 15, rotatable hook hinge 17, and release lever hinge pin 18.

FIGS. 14, 15, and 16 depicts the embodiment of the release mechanism depicted in FIGS. 11-12 in an open state. FIG. 14 is a frontal view of this embodiment of the release mechanism in an open state. FIG. 15 depicts a side view of this embodiment of the release mechanism shown in open state.

Figure 17:
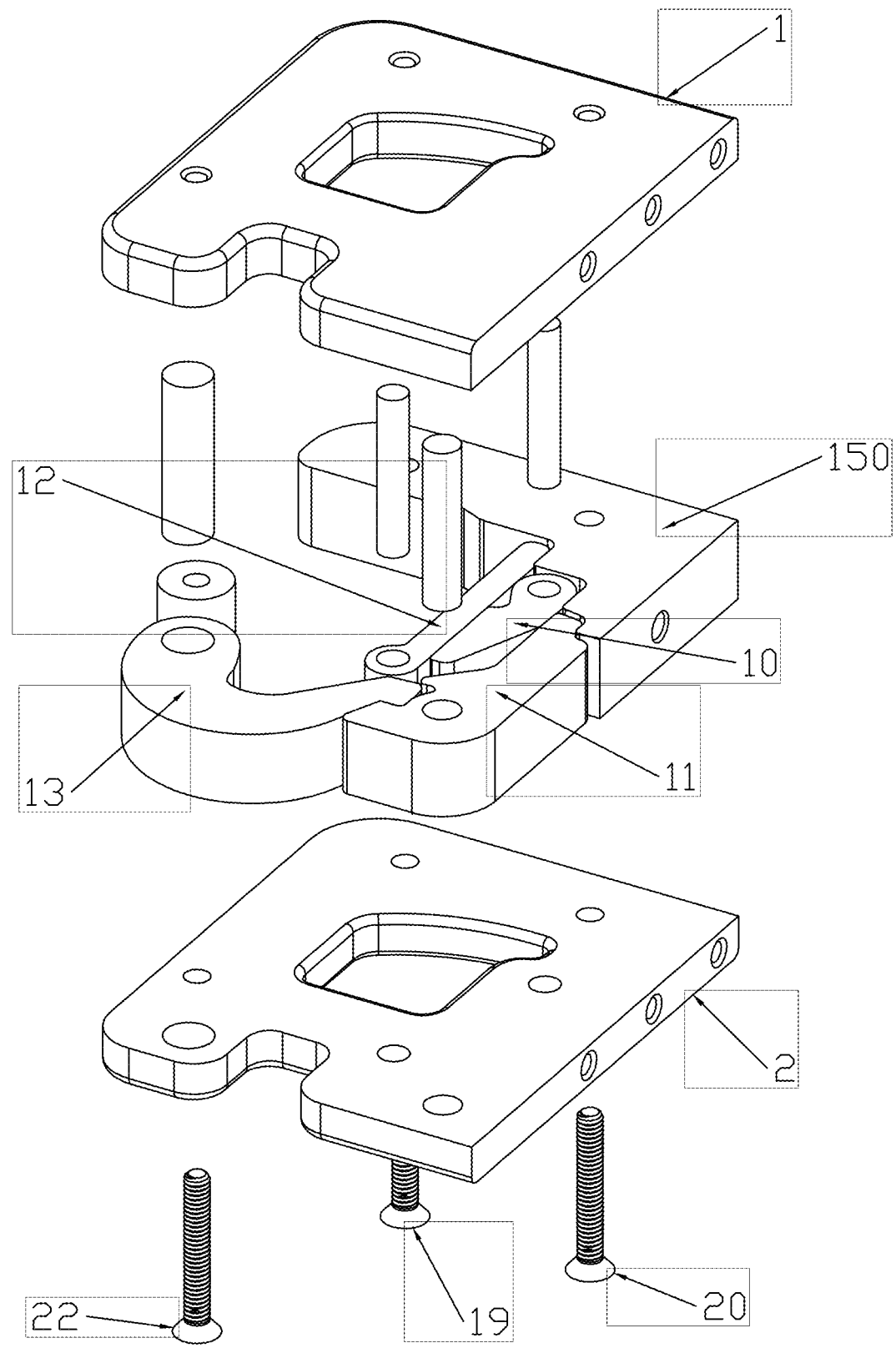
FIG. 17 depicts an expanded view of the release mechanism of FIG. 11 disassembled into component parts.

Referring to FIG. 17, the components of a version of the release mechanism in FIGS. 11-12 are shown in exploded view, with front plate 1 and rear plate 2 (displaced for clarity). Also shown are top spacer plate 150, top right pin 4, release lever 11 release activation line loop opening 50, middle lever 10, trigger lever 12, rotatable hook 13, rotatable hook hinge pin 17, hollow spacer 16, and release lever hinge pin 18, screws 19, 20, 22. The most notable difference between the embodiments depicted in FIGS. 3-9 and 11-17 is the fixed anchor region which in FIGS. 3-9 facilitates attachment and controlled detachment between two tensioned lines while in the embodiments depicted in FIGS. 11-17 the fixed anchor region facilitates attachment of the release mechanism between an object and a running line(s). The insertion direction of the screws may be from the front plate and/or rear plate and the direction of insertion is an engineering choice.

The skilled person would recognize the similarities of the levers and forces operating on the previously discussed embodiment as depicted in FIG. 10 also operate similarly on this embodiment.

Figure 18:
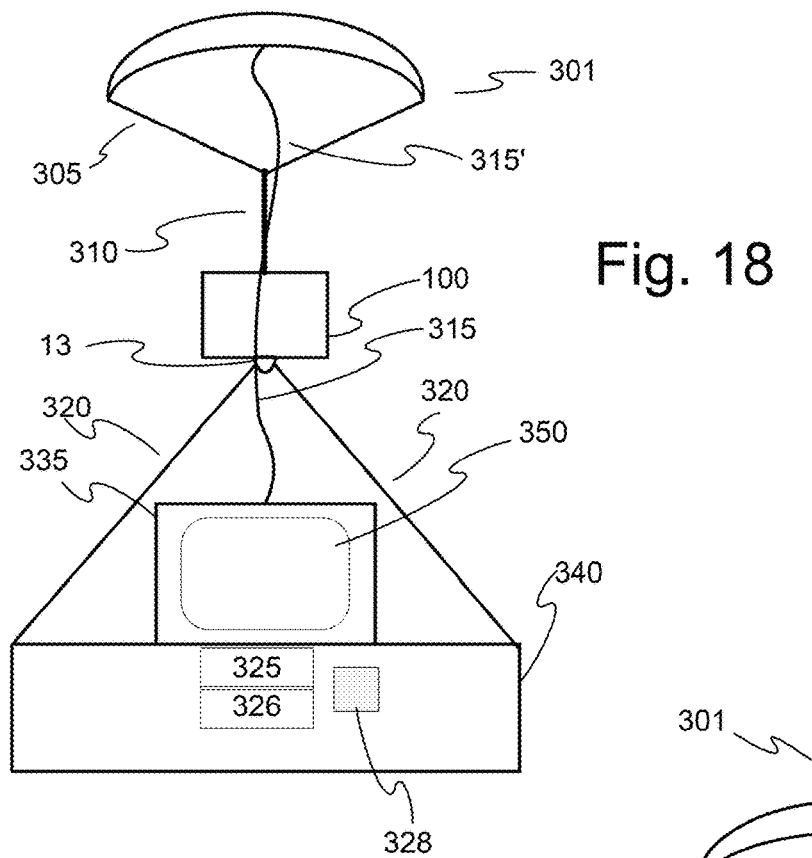
FIGS. 18 and 18A depict schematically a cargo parachute system utilizing a release mechanism, at two stages of the parachute deployment.
Figure 18A:
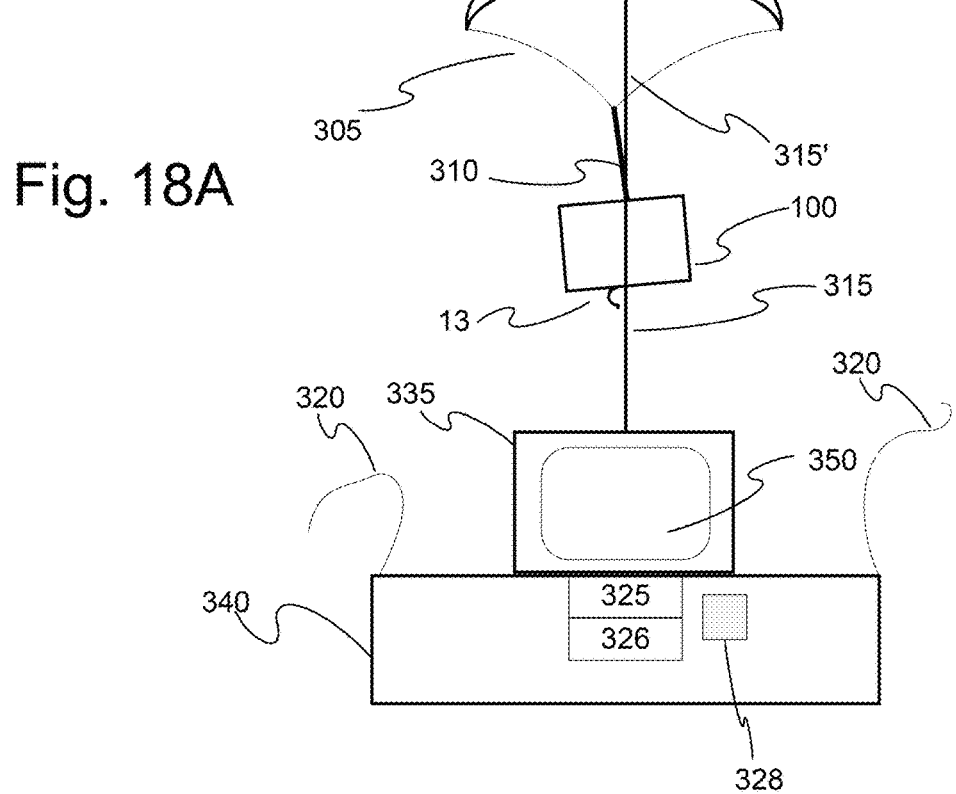

FIGS. 18 and 18A depict in schematic manner yet another aspect of the invention, consisting of a cargo parachute system 301 utilizing the release mechanism. The parachute deployment system utilizes the release mechanism depicted in FIGS. 3-9. In certain embodiments the cargo parachute system is steerable and controlled by a guidance system 326 as shown by way of example in FIGS. 18 and 18A. In the embodiments depicted in FIGS. 18 and 18A, as well as in other embodiments the actuator 325 is depicted as comprising a guidance system 326, with two spools, 341 and 342 respectively which guide the parachute via steering lines 343. However, such arrangement is not mandatory—the actuator may be a separate entity from the guidance system, and the guidance system as a whole is optional.

FIG. 18 depicts the cargo parachute system in drogue fall, shortly after it is dropped from an aircraft. When the system is dropped from the aircraft it is coupled to a static line (not shown) which deploys a drogue 305. The drogue is coupled to the cargo 340 by a drogue bridle 310, via release mechanism 100 and cargo drogue bridle 320. A main parachute 350 is coupled to the cargo. The main parachute 350 is held in a folded state by a deployment bag 335 which retains the main parachute and releases it in response to an activation force exceeding a predetermined level. The release of the main parachute may be affected in various ways, but generally the drogue parachute provides the needed force to begin the main parachute deployment.

A main activation line 315 is coupled between the drogue and the parachute deployment bag 335, and commonly but not necessarily, to the main parachute 350 itself. The main activation line 315 is coupled to a main parachute retention arrangement, which selectively maintains the main parachute 350 in in its pre-deployment position. In the presented example the main activation line 315 is coupled to the main parachute 350.

It is important to note that in the stage of drogue fall depicted in FIG. 18 the main activation line 315 does not exert sufficient force, if any, on the main parachute retention arrangement to release the main parachute deployment bag 335, since the drag caused by the drogue 305 is transferred to the cargo 340 by the drogue bridle 310, the release mechanism 100 and the cargo drogue bridle 320, which are under tension, while the main activation line 315 is not under significant tension, and commonly is not under any tension other than negligible wind drag operating on the main activation line, as long as the release mechanism 100 is in the closed state.

FIG. 18A depicts the cargo parachute system of FIG. 18 at the stage where the drogue 305 is utilized to deploy the main parachute 350. An actuator 325 triggers the release of release mechanism 100 by activating the release mechanism trigger. This is achieved by pulling the release activation line 6 which releases the release activation line loop 7, which in turn allows the release mechanism 100 to release the rotatable hook 13, releasing the tension between the drogue bridle 310 and the drogue cargo bridle 320. As the release mechanism is opened the main activation line 315 is brought under tension and transfers the drogue induced drag to the main parachute 350 and/or the main parachute retention arrangement, which holds the parachute deployment bag 335 in pre-deployment position. The drogue induced drag is sufficient to release the main parachute retention arrangement and to deploy the main parachute 350.

It is noted that after the release of the release mechanism 100 the drogue 305 may, in some embodiments, be allowed to collapse. In FIGS. 18 and 18A the main activation line 315 is coupled to the drogue by a line 315' which also acts as a line to collapse the drogue, known colloquially known in the art as a "kill line". In other embodiments, such as depicted by way of example in FIGS. 19 and 19A, the main activation line 315 is coupled to the drogue bridle. A kill line 315' may be utilized, but is not depicted in FIGS. 19 and 19A.

FIGS. 19 and 19A depict yet another embodiment of the cargo parachute system. In order to ease the accommodation of various loads, FIGS. 19 and 19A depict an embodiment with an intermediate load attachment platform. The platform 327 is coupled between the cargo and the main parachute. In such embodiments a bridle 373, colloquially known as a "sling" couples between the cargo 340 and the platform 327, and the main parachute 350 is coupled to the platform. Optionally the drogue 305 is also coupled to the platform 327. The platform provides a stable basis for the actuator 325 and to other optional equipment such as the guidance system 326 and/or other sensors, as well as a power source 328.

FIG. 19 depicts a cargo parachute system utilizing the platform 327 in drogue fall, shortly after it is dropped from an aircraft. When the system is dropped from the aircraft it is commonly coupled to a static line (not shown) which deploys a pilot chute or a drogue 305. The drogue is coupled to the platform by a drogue bridle 310, via release mechanism 100 and platform drogue bridle 321. The drogue 305 may optionally be coupled to the platform 327 via an intermediate member such as straps or other lines. A main parachute 350 is coupled to the platform and is held in a folded state by a deployment bag 335 which retains the main parachute and releases it in response to an activation force exceeding a predetermined level. The release of the main parachute may be affected in various ways, but generally the drogue parachute provides the needed force to begin the main parachute deployment.

In the embodiment of FIGS. 19 and 19A, the main activation line 315 is coupled between the drogue bridle 310 and the parachute deployment bag 335, and optionally but not necessarily, to the main parachute 350 itself. The main activation line 315 is coupled to the main parachute retention arrangement, which selectively maintains main parachute in the pre-deployment position, or allows the release of the main parachute for deployment.

Similar to the embodiment in FIG. 18, in the stage of drogue fall depicted in FIG. 19 the main activation line 315 does not exert sufficient force, if any, on the main parachute retention arrangement to release main parachute deployment bag 335 from the platform 327, since the drag caused by the drogue 305 is transferred to the cargo 340 by the drogue bridle 310, the release mechanism 100, the platform drogue bridle 321, the platform 327, and the sling 373 which are under tension, while the main activation line 315 is not under significant tension, and commonly is not under any tension other than wind drag operating on the main activation line, as long as the release mechanism 100 is in the closed state.

FIG. 19A depicts the parachute cargo system of FIG. 19 at the stage where the drogue 305 is utilized to deploy the main parachute 350. In the embodiment depicted in FIGS. 19 and 19A a portion of the guidance system 326 acts as the actuator 325. The guidance system 326 acting also as actuator 325 which triggers the release of release mechanism 100 by activating the release mechanism trigger. This may be achieved by a dedicated portion of the guidance system or by pulling the release activation line 6 utilizing steering spools 341 and 342 which are coupled, commonly indirectly, to the release activation line 6. Release activation line 6 releases the release activation loop 7 which in turn causes the release mechanism 100 to release the rotatable hook 13, releasing the tension between the drogue bridle 310 and the platform drogue bridle 321. More detailed example of a guidance system acting as the actuator may be seen in FIG. 24. As the release mechanism is opened the main activation line 315 is brought under tension, activating the release of the main parachute deployment bag 335, transfers the drogue induced drag to the main parachute bag 335. The drogue induced drag is sufficient to overcome the main parachute retention arrangement and to deploy the main parachute 350. As the release mechanism is opened the main activation line 315 is brought under tension and transfers the drogue induced drag to the main parachute 350 and/or the main parachute retention arrangement, which holds the parachute deployment bag 335 closed. The drogue induced drag is sufficient to overcome the main parachute retention arrangement and to deploy the main parachute 350. Those skilled in the art would readily recognize that utilizing the steering spools 341, 342, as actuators may be utilized in any of the cargo parachute systems where a guidance system is included. The actuator 325 may be embodied in numerous mechanisms. An altitude sensing actuator would actuate the release mechanism when an altitude sensor senses that the cargo parachute system is at a pre-configured altitude. An altitude sensor may be pressure activated, temperature activated or activated by radio telemetry. A timer-controlled actuator would actuate the release mechanism after a certain delay after being dropped from an aircraft. A speed sensor or acceleration sensor-controlled actuator would actuate the release mechanism upon reaching a pre-determined fall speed or acceleration. The actuator 325 may also be actuated by a location sensor which optionally may be embodied in the guidance system 326. The actuator may also be a radio-controlled actuator, a light controlled actuator, and the like. In certain embodiments multiples sensor systems and/or multiple actuators may be utilized in any combination of the above.

The guidance system 326 may be either a remote steering system operated by radio signals and/or light signals like a laser light, or an autonomous navigation system which may be inertial, radio, or satellite based. In some such embodiments the guidance system actuates the actuator, or in some embodiments the actuator is integral in the guidance system, as seen by way of example in FIG. 24.

It was discovered that oftentimes main parachute deployment bags are attached to the cargo in a manner that allows excessive freedom which may cause premature and/or defective deployment of the main parachute. The cargo parachute system is exposed to severe turbulence as it is initially dropped from an aircraft, potentially causing unpredictable orientations, oscillations, and the like. Furthermore, in systems utilizing intermediate load attachment platforms such as platform 327, the drogue deployment separates the platform from the cargo, which drops until the sling 373 becomes taught. That sudden stop of the cargo when the sling becomes taught is transmitted to the platform, causing a shock which may displace the main parachute deployment bag 335 relative to the platform and the actuator 325. Such displacement may accidentally activate the release mechanism, causing premature deployment of the main parachute.

To resolve this problem, in yet another aspect of the invention there is provided a parachute stabilization system. The parachute stabilization system is depicted schematically in FIGS. 20,21 and 21A. The parachute stabilization system is depicted in relations to a cargo parachute system utilizing an intermediate load attachment platform 327, however the skilled in the art would readily recognize that the stabilization system may alternatively be easily adapted to a cargo parachute system which does not utilize the platform 327, by attaching the parachute deployment bag 335 via the retention line(s) 375 to the cargo 340.

The parachute bag stabilization system is functional to secure the main parachute deployment bag 335 to the platform 327 during drogue fall. The stabilization system comprises at least one retention line which is taut during the drogue fall, and is released only after the release mechanism 100 is operated. It is noted that any release mechanism coupling the drogue bridle 310 and the drogue platform bridle 321 or the drogue cargo bridle 320 may be used, and the stabilization system is not limited to use of any specific release mechanism. The stabilization system comprises retention line(s) 375 extending tautly between the parachute bag 335 and the platform 327. Any retention line 375 may be fixedly coupled to the deployment bag 335, or to the platform 327. In an embodiment where the retention line is fixedly coupled to the platform, it is operationally coupled to the deployment bag via a releasable stabilization anchor 380. In an embodiment where the retention line is fixedly coupled to the deployment bag, it is operationally coupled to the platform via a releasable stabilization anchor attachment 380. In some embodiments a first portion of the retention line segment is coupled to the platform and a second portion of the retention line segment is fixedly coupled to the deployment bag, and the two portions of the line segment are operationally coupled by a releasable stabilization anchor attachment. The stabilization anchor is releasable in response dislodgment of a pull pin coupled directly or indirectly to the drogue parachute.

Figure 21A:
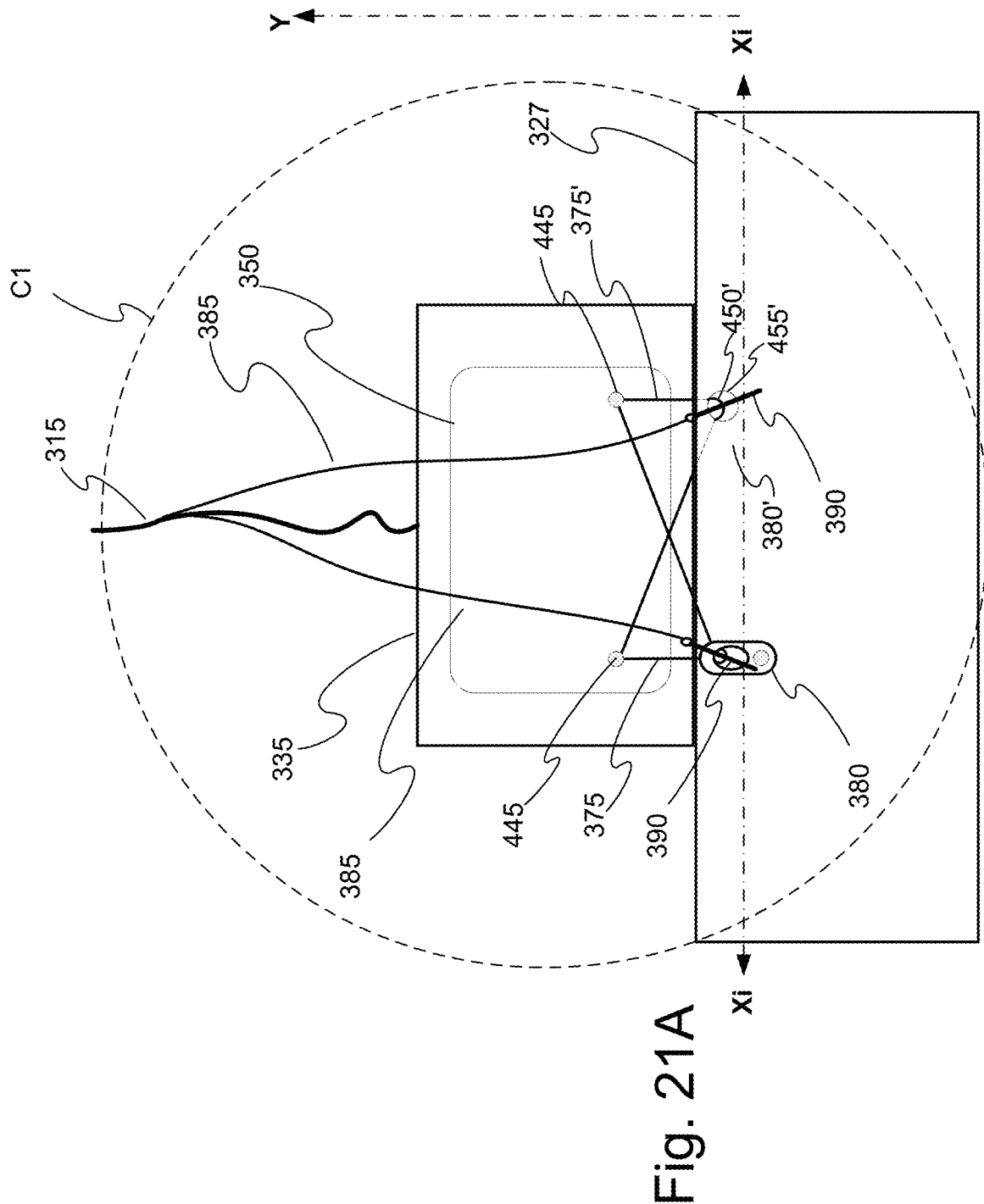

FIGS. 20, 21, and 21A depict a parachute stabilization system aspect of the invention. FIG. 20 depicts schematically the parachute stabilization system as it is applied to the parachute system of FIGS. 19 and 19A. FIGS. 21 and 21A are two exemplary arrangements of the parachute stabilization system shown as an enlargement of system elements encircled by segmented circle C1 in FIG. 20. FIGS. 22 and 22A-C detail exemplary stabilization anchor attachments. It is noted that FIG. 20 depicts a first embodiment of a stabilization anchor attachment depicted in FIG. 22, while FIGS. 21 and 21A depict other embodiments, depicted in FIGS. 22A-C.

The parachute deployment bag 335 is held firmly in place by taut retention lines 375, preventing excessive movement from the deployment bag prior to the release of the main parachute, thus stabilizing the parachute prior to its release. In one subset of embodiments, depicted by way of example in FIGS. 20-21, the retention lines 375 are coupled, directly or indirectly to the platform 327, and extend therefrom to respective stabilization anchor attachments coupled to the main parachute deployment bag 335. The retention lines are released when a bag release line 385 is pulled. Bag release line 385 may be attached directly or indirectly to the drogue 305 such that it is pulled only after the opening of the release mechanism 100. By way of example in FIG. 20 bag release line 385 is coupled to main activation line 315 which operationally becomes taut only after the opening of release mechanism 100. As described above, in this embodiment a kill line 315' is coupled to the main activation line.

To facilitate understanding of the stabilization system, FIGS. 20, 21, and 21A depict a plane marked schematically by dashed-doted line Xi-Xi extending generally disposed at the interface between the cargo attachment platform 327 and the parachute deployment bag, and a Y direction extending orthogonally to the Xi-Xi plane, the Y direction is considered to be vertical, and the arrow in the end of the line depicting the Y direction is considered to point upward. The Xi-Xi plane shall be termed in these specifications as the "interface plane. The interface plane and the Y direction are conceptual and created only to facilitate understanding of certain aspects of the invention, are relative to, and defined by, respective operational elements of the invention, and do not refer to any absolute orientation of the respective components. The interface plane Xi-Xi is shown parallel and below the actual interface between the platform 327 and the parachute deployment bag 335.

The parachute deployment bag 335 is equipped with a plurality of stabilization anchors attachments 380 and the retention lines 375 are controllably connected to the respective anchor attachment. FIG. 21 depicts a single retention line 375 on the right, a second retention line is shown divided into two segments, 375A and 375B. In certain embodiments only one segment of stabilization line 375 may be utilized. By way of example, the line segment 375A may be disposed at any non-zero angle $\alpha$ to the interface plane, and segment 375B may or may not be used. However, it was found that two lines extending from a single stabilization anchor provide improved stabilization. Therefore, the line 375 may be considered as having two active segments, 375A and 375B. Segment 375A extends from the platform 327 to the respective stabilization anchor attachment 380 while forming an angle $\alpha$ with the interface plane. Segment 375B extends diagonally from the platform 327 to the stabilization anchor 380, while forming an angle $\beta$ with the interface plane, and forming a non-zero angle $\tau$ with segment 375A. Segments 375A and 375B may be separate line pieces or a continuous line folded at the stabilization anchor attachment.

The depicted system utilizes two stabilization anchor attachments on the depicted side of the deployment bag, and the stabilization anchor attachments are disposed to both sides or the longitudinal center of the deployment bag, the longitudinal dimension of the deployment bag is considered parallel to the interface plane. In certain embodiments only a single stabilization anchor may be utilized per side, and such anchor attachment is preferably located substantially about the longitudinal center. The retention lines arrangement on the opposite side of the deployment bag may be similar to the depicted side or differ therefrom. In certain embodiments a single stabilization anchor attachment may be utilized with an arrangement of lines and/or flaps utilized to stabilized the parachute deployment bag which are operationally deployable to stabilize the deployment bag while the pin 390 is deployed in the respective retention member, and allow the release of the main parachute from the deployment bag once the pin is displaced.

Preferably, the angle β is smaller than the angle α An angle α of substantially 90° relative to the Xi-Xi plane would provide the best retention of the parachute deployment bag 335 in the vertical (Y) direction, practically equaling to the elongation of line segment 375A when taut. An angle α=60° would provide half the vertical retention of α=90°. It is desired that the segment 375B be longer than segment 375A, and the angle β be smaller than the angle α, forming a diagonal line segment where the retention force is divided equally between the vertical and horizontal directions when β=30°, and the horizontal retaining force increases as β approaches 0°. Similarly diagonal 375B line segment in the opposite side of the longitudinal center of the side of the bag would provide opposing horizontal forces for maintain the desired lateral disposition of the deployment bag, while cooperating vertical forces exerted by cooperating segments 375A on the two stabilization anchor attachments would maintain the desired vertical disposition of the deployment bag.

FIG. 21A depicts a similar force arrangement to the embodiment depicted in FIG. 21 however the retention lines 375 and 375' are fixedly attached to the main parachute deployment bag 335, and the stabilization anchor attachments 380 and 380' are coupled to the platform. For illustration purposes FIG. 21A also depicts two differing stabilization anchor attachments, namely 380 which is similar to the one depicted in FIG. 21A and is shown in greater detail in FIG. 22A, and 380', which is embodied as a hole in the platform 327 in cooperation with retention line 375' and pin 390'. Any combination of stabilization anchor attachment may be utilized in any embodiment of the invention as long as the stabilization anchor attachment provide for directly or indirectly tautly anchoring the retention line to the stabilization anchor attachment when the pull pin is engaged and to release the retention line when the pull pin is dislodged.

FIGS. 22, 22A, 22B, and 22C depict four exemplary stabilization anchor attachment point 380 construction.

Figure 22:
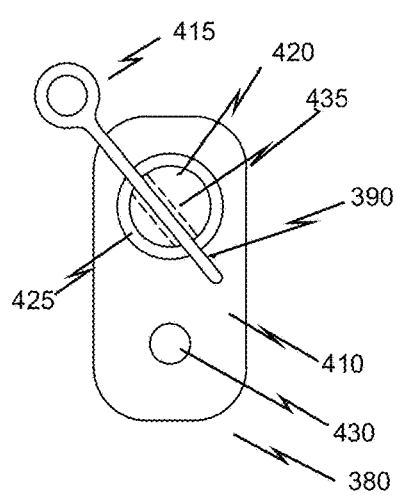
FIGS. 22, and 22A-C depict various exemplary embodiments of stabilization anchors of the parachute stabilization system.

Referring to FIG. 22, stabilization anchor attachment 380 comprises an anchor pin 420 coupled to the parachute deployment bag 335 or to the platform 327, in accordance with one embodiment of the stabilization system. The anchor pin has a pin cavity 435 defined therein, the pin cavity is dimensioned to receive a pull pin 390, having a ring portion 415 or any other line coupling mechanism in one end thereof, sufficient to act as an attachment point for bag release line 385. A plate 410 is coupled to at least one retention line 375 or retention line segment in any convenient manner, such as hole 430 by way of example. The plate further has an anchor passage 425 dimensioned to receive the anchor pin therethrough. When preparing the cargo parachute system for operation, the plate 410 is placed over the anchor pin 420 through passage 425 and positioned so that the pull pin 390, when inserted in the pin cavity 435 prevents the plate 410 from departing the deployment bag 335 as the plate is trapped between the deployment bag 335 or platform 327 and the pull pin. When the pull pin 390 is removed from the pin cavity 435 the plate 410 is free to disengage from the anchor pin 420 and thus to release the deployment bag 335.

Figure 22A:
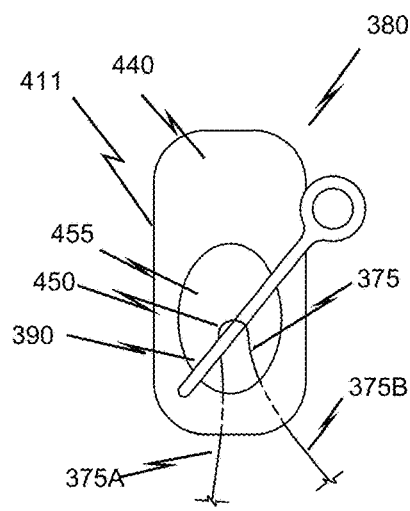

FIG. 22A depicts an embodiment of stabilization anchor attachment 380 of the type depicted in FIG. 21, and on the left side of FIG. 21A. An anchor plate 411 is anchored to the deployment bag 335 or to the platform 327. The upper area 440 of plate 411 is fixedly attached to the deployment bag or the platform. A hole 455 in the plate forms a passage through which a bight 450 in the retention line 375 may be formed, allowing the pull pin 390 to retain retention line 375 by engaging the bight 450. If desired an auxiliary tensioner may be utilized to pass the bight 450 in the passage sufficiently to pass pull pin 390 through the bight. The auxiliary tensioner (Not shown) may, by way of example include a line loop passing inside the bight and through the passage 455. Other tension producing aids may be utilized in order to tighten the deployment bag to the platform. In such embodiment the bight 450 divides the retention line 375 into segments 375A and 375B. The pull pin 390 traps the retention line 375 until it is dislodged, allowing line 375 to escape the passage and the release of the deployment bag from the platform.

Figure 22B:
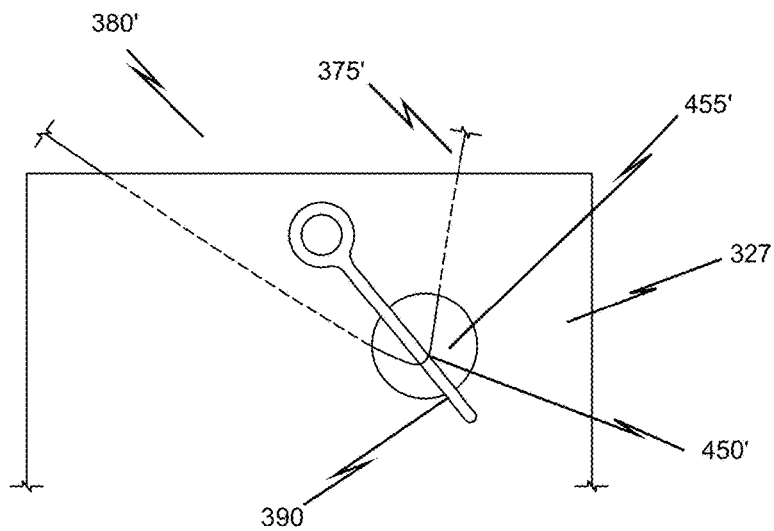

FIG. 22B depicts a stabilization anchor attachment somewhat similar to the stabilization anchor shown in FIG. 22A however the passage 455' is formed in the body or wall of the platform 327, instead of in the body of an anchor plate. A bight 450' in the retention line 375' is passed through the passage 455' and pull pin 390 is inserted into the bight 450'. The dashed portions of line 375' shown in FIG. 21A show an arrangement where the line segments pass on the internal side of the platform wall, and the bight 450' is transferred to external side of the platform wall. The skilled in the art would readily recognize that the opposite orientation may be utilized, where the retention lines are on the external side of the platform wall and the bight and pin extends via passage 455' to the internal side of the platform wall.

Figure 22C:
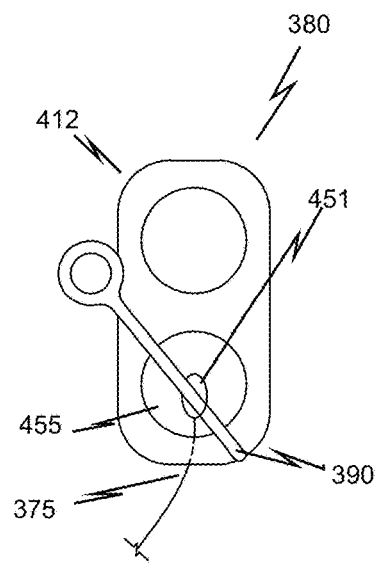

FIG. 22C depicts an embodiment of a stabilization anchor similar to the ones shown in FIGS. 22A and 22B however in the embodiment of FIG. 22C an eyelet 451 formed at the end of a retention line or is coupled to a retention line either directly or by a short line segment. The eyelet operates similarly to the bight in FIGS. 22A and 22B, and is engaged by the pull pin 390 to the plate 412 or the platform 327 via the passage 455 or 455' respectively until the pull pin is displaced sufficiently to allow the eyelet to escape. Anchor plate 412 is but one more example of the possible variations open to the designer of such plate, to best fit attachment of the plate to the respective bag 335, line 375, or platform 327.

Other optional variations of a stabilization anchor are considered, such the plate being replaced by a first line loop, and a second line loop or bight being routed via the first line loop acting as a retainer member when the pull pin acts to trap the retaining member to the first line loop. Notably as is the case in other elements of the invention the stabilization anchor may be made of any material fitting for the purpose it is respectively intended. Thus, by way of example the stabilization anchor plate may be formed of metal, plastic, fabric, fabric mesh, wood, and the like. It is further noted that the release of stabilizations anchor(s) may only allow release of the deployment bag 335 and opening the bag may be accomplished by a separate mechanism, or the release and opening of the bag may both be achieved by the release of the stabilization anchor(s).

As seen in FIGS. 20, 21, and 22 pull pins 390 of individual stabilization anchor attachments 380 are coupled to respective bag release lines 385, which are in turn coupled to the main activation line 315. It is noted that the method of attachment of the plate 411 or 410 may vary, such as by suitable fastening, knotting, a riveting, stitching, and the like, and the attachment is a matter of engineering choice.

When the release mechanism 100 activates and releases the tension between the drogue bridle 310 and the drogue cargo bridle 320, the tension of the drag from the drogue 305 is transferred to the main activation line 315 as described supra. The main activation line pulls the respective bag release lines 385 which are coupled to the respective pull pins 390, thus drawing the pull pins from the respective pin cavities or line bights, and allowing the respective retention lines 375 to disengage the respective stabilization anchor attachments, releasing the deployment bag 335 and allowing the main parachute 350 to deploy. In some embodiments the deployment bag may open after the stabilization anchor attachments are released, and in some embodiments release of additional closing mechanism(s) is required for the deployment bag to open. In certain embodiments the drogue exerts forces to deploy the main parachute.

Figure 23:
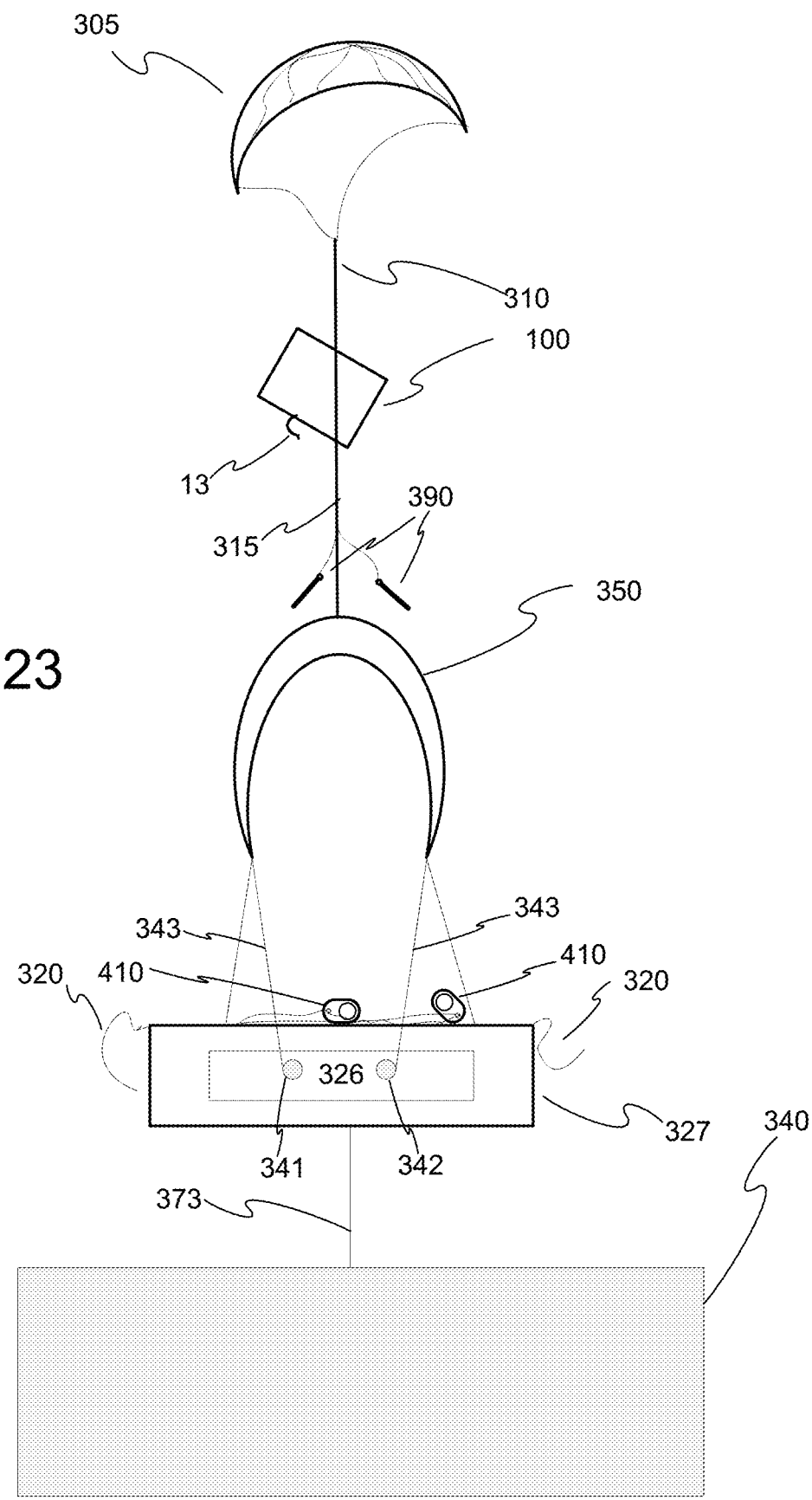
FIG. 23 depicts schematically the cargo parachute system after the main parachute 350 is drawn out its deployment bag, prior to full inflation.

FIG. 23 depicts schematically the cargo parachute system after the main parachute 350 is drawn out its deployment bag, prior to full inflation. The drogue 305 is shown as it begins to collapse. The pull pins 390 are also shown after being pulled from their respective anchor pins 420, bight 450 in a retention line, or an eyelet 451 coupled to retention line. The main parachute begins to inflate and slows the descent of the cargo 420, which is connected to platform 327 by sling 373. Sling 373 may be embodied by a single line or plurality of lines, which are commonly webbings. In the depicted embodiment steering lines 343 are coupled to steering spools 341 and 342 of the guidance system 326.

In some embodiments the guidance system 326 is sufficiently sturdy and acts as an intermediate load attachment platform 327.

Figure 24:
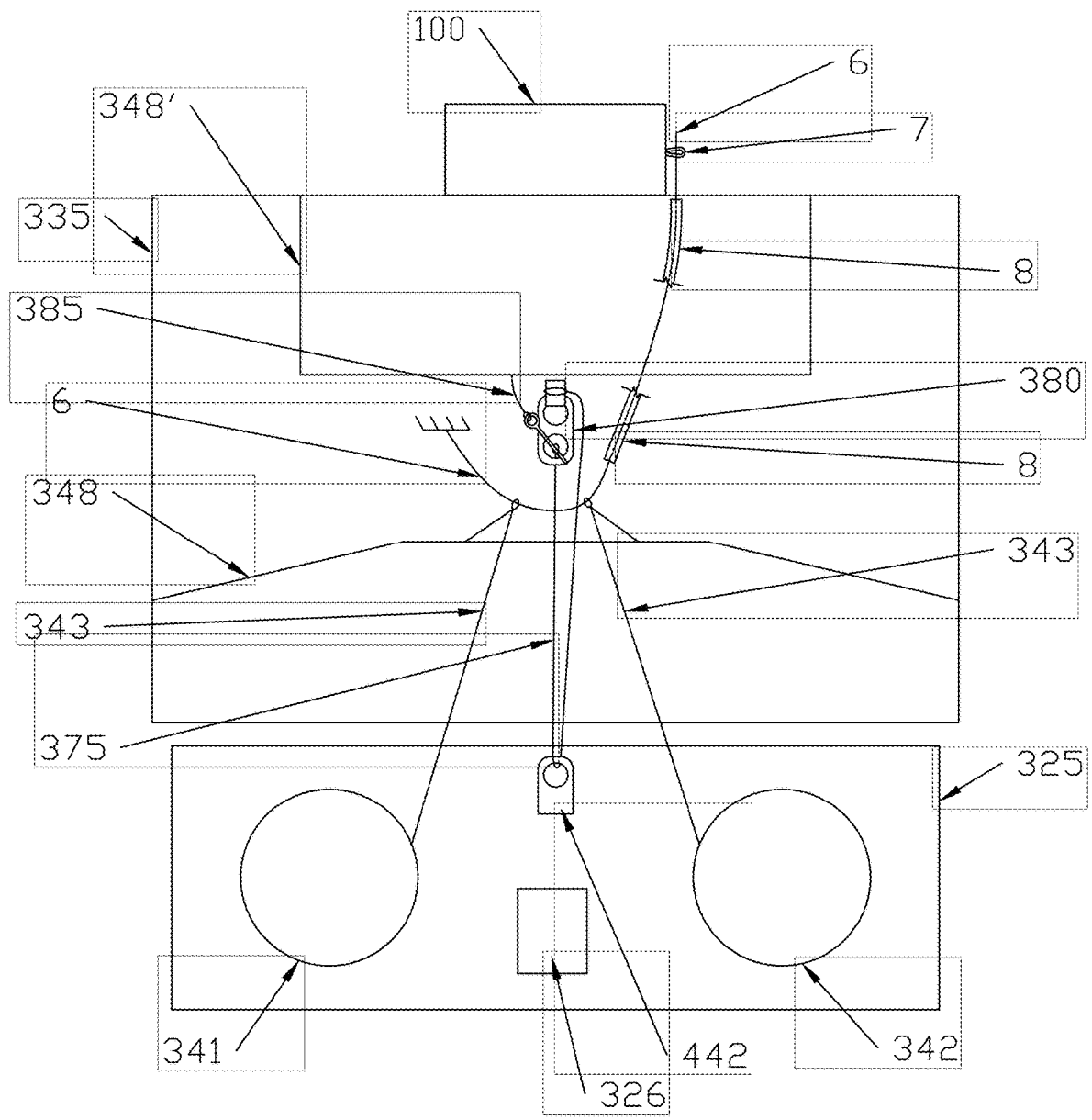
FIGS. 24-26 depict various portions of cargo parachute system including a release mechanism and other components.
Figure 25:
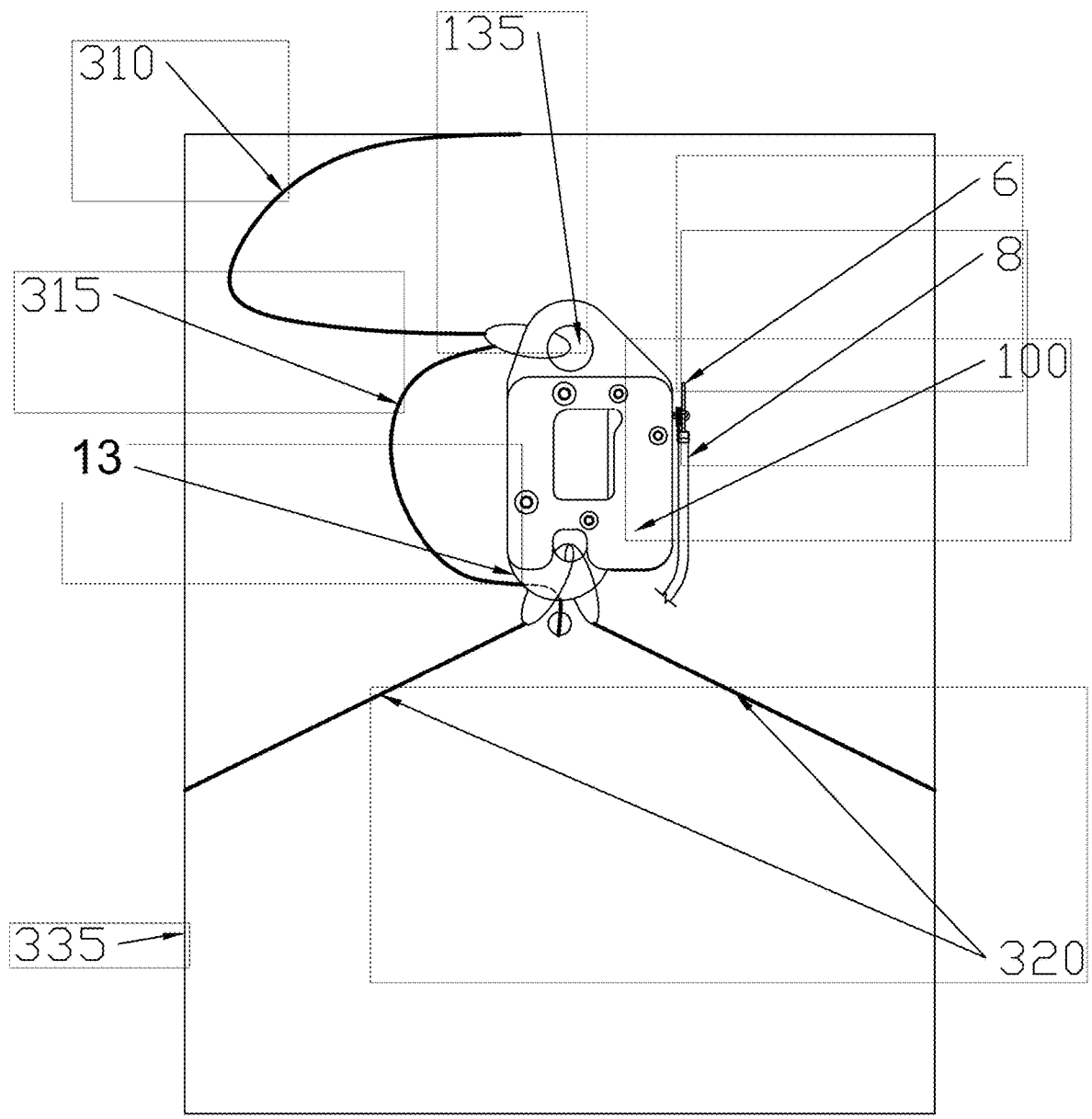
Figure 26:
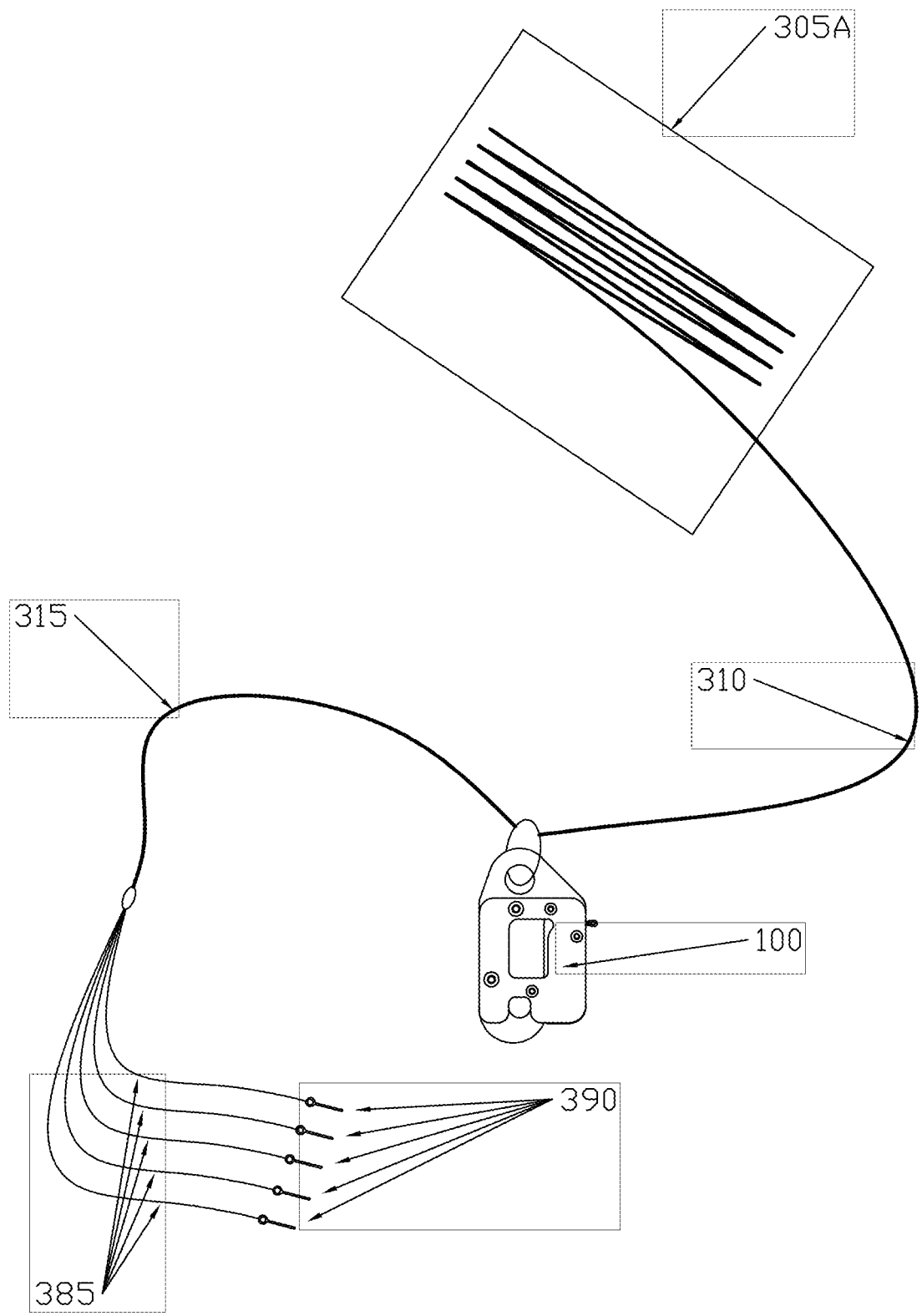

FIGS. 24-26 are drawings of an exemplary embodiment of portions of a cargo parachute system depicting certain components.

FIG. 24 shows a parachute deployment bag 335 which contains the main parachute 350, actuator 325 which in the depicted embodiment is embodied by guidance system 326, as well as deployment bag retention line 375 coupled to the deployment bag by a stabilization anchor attachment 380. The steering spools 341 and 342 may initiate the release activation line 6 by both spools pulling downward to pull steering lines 343 and thus pull and withdraw the activation line 6 from the release activation loop 7, allowing the release mechanism to transition to the open state. In this manner the guidance system 326 acts as actuator 325, and, as seen, in this embodiment the guidance system packaging acts as the platform 327. The steering lines 343 are coupled to the main parachute 350 and are routed behind the bag flap 348 prior to the deployment of the main parachute. After and optionally during main parachute 350 deployment and/or inflation, the steering spools may both pull the steering lines 343 downward or upward to manipulate the steering lines and steer the main parachute 350 after it has been deployed from the deployment bag. As indicated by the discontinuous depiction of activation line house 8, the drawing does not show the whole length of the activation line and optionally the activation line housing, as it extends to the release mechanism 100 during the drogue fall.

FIG. 24 depicts yet another embodiment of the retention system, in which the retention line 375 is routed as a loop, beginning with an end attached to the deployment bag, and slidingly routed via a platform anchor 442, and thence to the stabilization anchor 380, which in this embodiment is of the type depicted in FIG. 22C. The pull pin of the stabilization anchor is dislodged from the eyelet by a bag release line 385, which is routed behind deployment bag upper flap 348'. This embodiment requires only an anchor point on the platform capable of slidingly supporting a retention line.

FIG. 25 shows the release mechanism 100 with a standing line, embodied by drogue bridle 310 coupled to fixed anchor point 135, and a running line embodied by drogue cargo bridle 320 or drogue platform bridle, coupled to the release mechanism hook 13. It is clear that when the cargo system is dropped and the drogue opens, it would present drag to the cargo and make taught lines 310 and 320. Release activation line 6 is disposed in activation line housing 8 and maintains the release mechanism 100 in closed state. When release activation line 6 is withdrawn the release mechanism 100 opens, allowing the drogue bridle 310 and drogue cargo bridle 320 to separate. In some embodiments the drogue platform bridle or the drogue cargo bridle are coupled via the main parachute deployment bag.

FIG. 26 shows a drogue disposed within drogue bag 305A, coupled to drogue bridle 310 which is coupled to release mechanism 100. The drogue bridle couples to main activation line 315 which in turn is coupled to bag release lines 385 and then to respective pull pins 390.

In an example of making the depicted embodiment of the release mechanism, as shown in FIG. 9, rear plate 2 is placed on a work surface and the remaining components of the mechanism are added in any logical order. The placement and location of the various components for this embodiment are clearly shown in the drawings FIG. 3, FIG. 4, FIG. 5, FIG. 6, FIG. 7, FIG. 8 and FIG. 9 as will be clear to a person skilled in the art. The components may be made from hard plastic injection, 3D printer, cut out from suitable bulk raw material, machined metal, etc. or any other suitable material, In an example of using the depicted embodiment of the release mechanism in a cargo parachute drogue arrangement, one would attach a standing line, such as a drogue parachute (or other drag-inducing device or tensile load inducing object) by way of example to the fixed anchor point 105 in top mount plate 3, and, with the mechanism in the open state, attach the running line coupled to a tensile load inducing object, such as parachute deployment bag by way of example to rotatable hook 13, then close the rotatable hook and interlock the levers in a pre-configured arrangement such that the retention portions of the release lever 11 retains the hook abutment, and the middle and trigger levers cooperate to maintain the release lever in the closed position. Arranging the levers in such arrangement brings the release mechanism to a closed state. As shown in the drawings, release activation loop 7 protrudes through the right-side release activation loop opening 50, ready to accept the release activation pin 6 through the loop. During deployment the activation line may be pulled through the loop via any suitable pulling/tension device; spring, piston, manually, intermediate line, hydraulic, electric motor, electric spools, pneumatic, magnetic, or any other device/method suitable to exert sufficient tensile force in the activation cable to withdraw the cable from the loop. Pin 6 may be embodied in a cable, a pull pin, a pin coupled to an electromagnet or motor, a wire, and the like.

An actuator 325 causes the release activation pin 6 to release the activation loop 7 of release mechanism 100. The actuator may release the activation pin based on input from a sensor, such as an altitude sensing actuator, a timer actuator, a speed sensor actuator, an acceleration sensor actuator, a location sensor actuator, a radio controlled actuator, a light controlled actuator, a guidance system controlled actuator, and any combination thereof.

A person skilled in the art would, in light of the present disclosure, readily recognize numerous pre-configured arrangements of a plurality of interlockable levers deployed in a tension release mechanism which are obvious variations from the disclosed examples and such variations should be construed as falling under the scope of various aspects of the invention.

The lever(s) may be any suitable shape sufficient to accomplish the intended purpose i.e. straight, curved, angled, compound curve, geometric, elongated, and the like, by way of non-limiting example. Furthermore, the rotatable hook acts as the last lever in the sequential flow of levers operational to selectively maintain or release a running line and may as well as other levers may be embodied with any suitable shape sufficient to accomplish that intended purpose, alone or in cooperation with other components. Thus, the rotatable hook lever is not limited to any specific shape.

No device and/or system is known to this inventor that addresses the deficiencies in the earlier art as is used in conventional drogue parachute release mechanisms for cargo delivery systems. These new, useful and unobvious aspects of the invention, in various embodiments, accomplish this much needed advantage of increased safety, reliability and optimal adjustment of high tensile load releases.

The attachment arrangement and/or devices and methods for connecting a tension device (drogue parachute or other tensile load inducing component) to the fixed anchor point 105 may be of any suitable type—loop, aperture, glue, sewn, webbing, fastener, screw, bolt, weld, friction adapter, snap shackle, connector link (either hard or "soft" as known in the art), grommet, snap, rivet, thread, rope, twine, rod, dowel, hook, plug, connector, and/or any other connecting arrangement, either attached/secured permanently, temporarily and/or releasably attached. As disclosed, the release mechanism may be attached or built into an object and the fixed anchor point is the object as a whole, or any portion of the release mechanism frame or attachment plates.

Connecting a tension load to the rotatable hook 13 may be all of any releasable type—loop, aperture, webbing bridle, sling, snap shackle, connector link (either hard or "soft" as known in the art), thread, rope, twine, hook, ring, shackle, eyelet, releasable connector, and/or any other connecting arrangement, either attached temporarily and/or releasably coupled to a second object forming, in combination with the object coupled to the fixed anchor point tensile tension therebetween.

Notably, a taut line may be held by the rotatable hook indirectly by an intervening object and the usage of such intervening object should be construed as falling under the scope various aspects of the invention.

Various components of embodiments of the force reduction release mechanism may be integrated onto each other and/or formed of a plurality of cooperating portions, while still falling under the scope of the invention and the claims.

Versions of the invention may be made with any and all suitable materials desired as needed for the appropriate use and the invention and embodiments thereof are not limited by the type of materials used in implementing thereof. Versions are scalable and may be made any suitable size. Versions of the invention may be retrofitted to existing (used) conventional parachute cargo systems, canopy release systems, and the like, and/or manufactured as new systems.

To make a version of the invention in a preferred embodiment, one skilled in the art may follow instructions and drawings disclosed herein, by way of example and for illustration, however these instructions and drawings should not be construed as limiting. User manuals entitled "CPS-AMBASSADOR 4K-REV-0 TECHNICAL MANUAL" and "Ambassador 2K Technical manual" depicting and explaining exemplary embodiments and aspect of the invention, are appended to this disclosure for more detailed explanations as to assembling and using versions and aspects of the invention(s).

The term release force as used herein relates to force required to directly or indirectly be applied to a portion of the trigger, such as by way of example, a release activation line through the release activation loop to affect a release the trigger lever and subsequently release a taut line held by the rotatable hook as explained above, or to forces required to be applied directly or indirectly to another portion of the release mechanism to maintain the tensile tension between the running and standing lines.

The term lines encompass actual lines—ropes, cables, wires, cords, webbing, and the like, group or groups of lines, such as a plurality of separate lines, as well as rods, shackles, eyelets, hooks, links, and the like. Any combination of lines and extensions thereof such as shackles, eyelets, and the like should be construed as the line itself. The term line also extends to a portion of an object which constitutes one part of a load which is applied to the release mechanism in the closed state, and released thereby when the release mechanism is in the open state.

Notably, whenever the term 'and/or' is used in these specifications and the attached claims, it should be construed as any number, combination or permutation of all, one, some, a plurality or none of each of the item or list mentioned. It is also understood that (s) designates either singular or plural. It is further understood that that "or" is an inclusive "or" to include all items in a list and not intended to be limiting and means any number, combination or permutation of all, one or plurality of each of the item or list mentioned, unless the term 'or' is explicitly defined as exclusive, or if the context would clearly indicate an exclusive or to the skilled artisan. It is also understood that "include(s)" and/or "including" means "including but not limited to" any number, combination or permutation of all, one or plurality of each of the item or list mentioned.

Although the foregoing invention has been described in detail by way of illustration and example, it will be understood that the present invention is not limited to the particular description and specific embodiments described but may comprise any combination of the above disclosed elements and their equivalents and variations thereof, many of which will be obvious to those skilled in the art in view of the present disclosure, and the invention extends to such variations.

We claim:

1. A tension release mechanism having a closed state and an open state, the release mechanism comprising:
   a support frame;
   a fixed anchor region disposed in the frame or coupled thereto;
   an arrangement of sequentially interlockable levers rotatably coupled to the frame, the assembly comprising:
   a) a trigger lever rotatable about a trigger lever fulcrum, the trigger lever having a retaining region;
   b) a middle lever rotatable about a middle lever fulcrum the middle lever having a middle lever abutment, and being disposed such that when the release mechanism is operationally in the closed state the middle lever abutment rests against the trigger lever at a trigger lever load region;
   c) a release lever rotatable about a release lever fulcrum, the release lever having release lever abutment and a hook retainer, the release lever being disposed such that when the release mechanism is operationally in the closed state the release lever abutment rests against the middle lever at a middle lever load region;
   d) a hook rotatable about a hook fulcrum, the hook having a hook abutment region, the hook being disposed such that when the release mechanism is operationally in the closed state the hook abutment directly or indirectly engages the hook retainer and at least a portion of the hook cooperates with at least a portion of the frame, to define a closure dimensioned to retain an operationally tensioned line or an extension thereof; and, a trigger coupled to the trigger lever retraining region, the trigger being operative to selectively maintain the trigger lever at a locked state where the trigger lever prevents the middle lever from rotating away from the release lever, the release mechanism configured such that operationally when the trigger lever is not in the locked state the middle lever is capable of rotating away from the release lever, allowing the release lever to rotate and release the hook abutment from the hook retainer.

2. The mechanism of claim 1 wherein the trigger comprises a trigger line routed outside of the frame through an opening therein.

3. The mechanism of claim 2 wherein the trigger line terminates in a loop.

4. The mechanism of claim 3, further comprising a release pin disposed to selectively retain and release the trigger line.

5. The mechanism of claim 1 further comprising a protrusion disposed at an angle to a longitudinal axis of the release lever, comprises the hook retainer being coupled to, or integral with the protrusion.

6. The mechanism of claim 1, wherein the frame comprises a first and a second plate and at least the hook and the release lever are disposed between the first and second plate.

7. The mechanism of claim 6, wherein at least one of the first and second plates having a void therein.

8. The mechanism of claim 1, wherein the frame comprises a backing plate.

9. The mechanism of claim 1 wherein when the release mechanism is in the closed state, the closure is defined by a portion of the frame and by a cooperating portion of the hook disposed between the hook fulcrum and the hook abutment.

10. The mechanism of claim 1 wherein the mechanism is connected to a tension inducing object at the fixed anchor region.

11. The mechanism of claim 1, wherein the closure forms a partially open periphery, the periphery dimensioned so as to retain the tensioned line therein when the mechanism is in the closed state, and release the tensioned line therefrom when the mechanism is in the open state.

12. The mechanism of claim 1, wherein the closure forms a closed periphery, the periphery dimensioned so as to retain the tensioned line therein when the mechanism is in the closed state.

13. The mechanism as claimed in claim 1, wherein the fixed anchor point is configured to be coupled to a standing line.

14. A cargo parachute system for parachuting a cargo load, the system comprising:
 an actuator;
 a main parachute coupleable directly or indirectly to the cargo;
 a cargo drogue bridle couplable directly or indirectly to the cargo;
 a drogue parachute having a drogue bridle;
 a release mechanism as claimed in claim 1, the release mechanism being operationally coupled between the drogue bridle and the cargo drogue bridle, and the trigger of the release mechanism being operationally controlled by the actuator such that operationally the actuator selectively transitions the release mechanism from the closed state to the open state;
 the cargo parachute system being rigged such that a main parachute deployment sequence is initiated subsequent to the release mechanism transitioning from closed state to open state.

15. The cargo parachute system off claim 14 wherein the main parachute is disposed in a deployment bag openable subsequently to the release mechanism transitioning from closed state to an open state.

16. The cargo parachute system of claim 14 further comprising a main activation line operationally coupled between the parachute and the drogue parachute, and wherein the main activation line becomes taught subsequent to the transition of the release mechanism, thereby activating the main parachute deployment sequence.

17. The parachute system of claim 14, wherein the actuator is selected from an altitude sensing actuator, a timer controlled actuator, a speed sensor controlled actuator, an acceleration sensor controlled actuator, a location sensor controlled actuator, a radio controlled actuator, a light controlled actuator, a guidance system controlled actuator, and any combination thereof.

18. The parachute system of claim 14 further comprising a guidance system operative to direct the glide path of the parachute system.

19. The parachute system of claim 18, wherein the guidance system comprises a navigation system.

20. The parachute system of claim 19 wherein the guidance system further comprises the actuator or is configured to activate the actuator.

* * * * *

UNITED STATES PATENT AND TRADEMARK OFFICE
CERTIFICATE OF CORRECTION

| | |
|---|---|
| PATENT NO. | : 11,667,389 B2 |
| APPLICATION NO. | : 16/886726 |
| DATED | : June 6, 2023 |
| INVENTOR(S) | : Coe et al. |

It is certified that error appears in the above-identified patent and that said Letters Patent is hereby corrected as shown below:

On the Title Page

Item (74) Attorney, Agent, or Firm: Replace "Shalom Wertsberger, Saltamar Innovations" with
-- Frank B. Arenas, Esq., Shalom Wertsberger --

Signed and Sealed this
Twenty-ninth Day of August, 2023

Katherine Kelly Vidal
*Director of the United States Patent and Trademark Office*